US012163360B2

(12) United States Patent
Patane et al.

(10) Patent No.: US 12,163,360 B2
(45) Date of Patent: Dec. 10, 2024

(54) CLOSURE LATCH ASSEMBLY EQUIPPED WITH SINGLE RATCHET/PAWL LATCH MECHANISM AND A POWER LATCH RELEASE MECHANISM WITH A DUAL-STAGE GEAR TRAIN

(71) Applicant: Magna Closures Inc., Newmarket (CA)

(72) Inventors: Francesco Patane, Pisca (IT); Alessandro Carli, Cascina (IT); Carlo Quartieri, Pontedera (IT)

(73) Assignee: Magna Closures Inc., Newmarket (CA)

( * ) Notice: Subject to any disclaimer, the term of this patent is extended or adjusted under 35 U.S.C. 154(b) by 221 days.

(21) Appl. No.: 17/332,041

(22) Filed: May 27, 2021

(65) Prior Publication Data

US 2021/0372169 A1 Dec. 2, 2021

Related U.S. Application Data

(60) Provisional application No. 63/033,262, filed on Jun. 2, 2020.

(51) Int. Cl.
*E05B 81/36* (2014.01)
*E05B 81/14* (2014.01)
(Continued)

(52) U.S. Cl.
CPC .............. *E05B 81/36* (2013.01); *E05B 81/14* (2013.01); *E05B 81/16* (2013.01); *E05B 81/30* (2013.01);
(Continued)

(58) Field of Classification Search
CPC .......... E05B 81/06; E05B 81/14; E05B 81/16; E05B 81/30; E05B 81/34; E05B 81/36;
(Continued)

(56) References Cited

U.S. PATENT DOCUMENTS

| | | | | |
|---|---|---|---|---|
| 4,518,180 A | 5/1985 | Kleefeldt et al. | | |
| 6,557,911 B2 * | 5/2003 | Nelsen | E05B 81/14 | 292/201 |

(Continued)

FOREIGN PATENT DOCUMENTS

| | | |
|---|---|---|
| CN | 103089089 A | 5/2013 |
| CN | 103375068 A | 10/2013 |

(Continued)

*Primary Examiner* — Kristina R Fulton
*Assistant Examiner* — Noah Horowitz
(74) *Attorney, Agent, or Firm* — Dickinson Wright PLLC

(57) ABSTRACT

A latch assembly for a closure panel of a vehicle includes a power release actuator, a pawl, a ratchet, and a multi-stage geartrain. The multi-stage geartrain includes a first compound gear and a second sector gear in meshed engagement with the compound gear. The sector gear includes an arm extending radially therefrom. In a rest position, a gap is defined between the arm and a cam surface of a pawl. Actuation of the power release actuator actuates the multi-stage geartrain and pivots the arm through the gap and into contact with the pawl. During pivoting through the gap, inertia is increased and the arm contacts the pawl with an impulse force. Continued rotation of the arm causes further rotation of the pawl and release of the ratchet. The arm is disposed within an axial height defined by the multi-stage geartrain, and torque applied to the arm increases during rotation.

23 Claims, 31 Drawing Sheets

(51) Int. Cl.

| | |
|---|---|
| ***E05B 81/16*** | (2014.01) |
| ***E05B 81/30*** | (2014.01) |
| ***E05B 81/42*** | (2014.01) |
| ***E05B 81/66*** | (2014.01) |
| ***E05B 81/90*** | (2014.01) |
| ***E05B 83/36*** | (2014.01) |

(52) U.S. Cl.
CPC .............. *E05B 81/42* (2013.01); *E05B 81/66* (2013.01); *E05B 81/90* (2013.01); *E05B 83/36* (2013.01)

(58) Field of Classification Search
CPC .......... E05B 81/42; E05B 81/64; E05B 81/66; E05B 81/68; E05B 81/90; E05B 83/36
See application file for complete search history.

(56) References Cited

U.S. PATENT DOCUMENTS

| | | | | |
|---|---|---|---|---|
| 6,988,749 | B2 * | 1/2006 | Hashiba | E05B 81/54 292/216 |
| 7,111,877 | B2 | 9/2006 | Larsen et al. | |
| 7,192,066 | B2 | 3/2007 | Ilea et al. | |
| 7,766,397 | B2 * | 8/2010 | Carabalona | E05B 81/20 292/201 |
| 7,791,218 | B2 | 9/2010 | Mekky et al. | |
| 7,827,836 | B2 | 11/2010 | Cetnar | |
| 8,764,075 | B2 | 7/2014 | Taurasi et al. | |
| 9,046,439 | B2 * | 6/2015 | Taurasi, I | E05B 81/14 |
| 9,394,728 | B2 | 7/2016 | Tomaszewski et al. | |
| 10,138,656 | B2 | 11/2018 | Dente et al. | |
| 10,174,527 | B2 * | 1/2019 | Dente | B60L 58/15 |
| 10,214,945 | B2 | 2/2019 | Cetnar | |
| 10,370,879 | B2 | 8/2019 | Tomaszewski | |
| 10,378,252 | B2 * | 8/2019 | Ottino | E05B 81/68 |
| 10,654,374 | B2 | 5/2020 | Marlia et al. | |
| 10,767,396 | B2 | 9/2020 | Distefano et al. | |
| 11,525,288 | B2 * | 12/2022 | Schiffer | E05B 85/26 |
| 2004/0093919 | A1 | 5/2004 | Mooney et al. | |
| 2005/0200137 | A1 | 9/2005 | Nelsen et al. | |
| 2006/0261601 | A1 * | 11/2006 | Shimizu | E05B 81/14 292/216 |
| 2008/0073918 | A1 | 3/2008 | Arabia, Jr. et al. | |
| 2008/0224482 | A1 * | 9/2008 | Cumbo | E05B 81/40 292/201 |
| 2009/0236862 | A1 | 9/2009 | Tomaszewski et al. | |
| 2009/0236863 | A1 * | 9/2009 | Akizuki | E05B 81/14 292/201 |
| 2009/0288506 | A1 | 11/2009 | Larsen et al. | |
| 2010/0117379 | A1 | 5/2010 | Mitchell et al. | |
| 2010/0244466 | A1 | 9/2010 | Tomaszewski | |
| 2012/0125133 | A1 | 5/2012 | Tomaszewski | |
| 2015/0308163 | A1 | 10/2015 | Tomaszewski | |
| 2016/0053517 | A1 | 2/2016 | Tomaszewski | |
| 2016/0312499 | A1 | 10/2016 | Fannon et al. | |
| 2017/0089103 | A1 | 3/2017 | Ottino et al. | |
| 2017/0314298 | A1 | 11/2017 | Tomaszewski | |
| 2018/0044950 | A1 | 2/2018 | DiStefano et al. | |
| 2018/0058116 | A1 | 3/2018 | Erices et al. | |
| 2018/0087298 | A1 | 3/2018 | Strole et al. | |
| 2019/0063117 | A1 | 2/2019 | Mozola | |
| 2019/0136590 | A1 | 5/2019 | Patane et al. | |
| 2019/0161996 | A1 | 5/2019 | Taurasi et al. | |
| 2019/0271179 | A1 | 9/2019 | Patane et al. | |
| 2020/0224464 | A1 | 7/2020 | Cumbo | |
| 2020/0332570 | A1 | 10/2020 | Tomaszewski | |
| 2020/0370346 | A1 | 11/2020 | Okeke et al. | |

FOREIGN PATENT DOCUMENTS

| | | | | |
|---|---|---|---|---|
| CN | 104847189 | A | 8/2015 | |
| CN | 105019742 | A | 11/2015 | |
| DE | 19913666 | A1 * | 9/2000 | E05B 77/42 |
| EP | 0978609 | A1 | 2/2000 | |
| WO | 2009030046 | A1 | 3/2009 | |
| WO | 2015044323 | A1 | 4/2015 | |
| WO | 2021062541 | A1 | 4/2021 | |

* cited by examiner

CLOSURE LATCH ASSEMBLY EQUIPPED WITH SINGLE RATCHET/PAWL LATCH MECHANISM AND A POWER LATCH RELEASE MECHANISM WITH A DUAL-STAGE GEAR TRAIN

FIELD

The present disclosure relates generally to closure latch assemblies for use with a closure panel in a motor vehicle closure system. More particularly, the present disclosure is directed to a closure latch assembly equipped with a latch mechanism, a latch release mechanism, and a power release actuator having a dual-stage geartrain and a mechanical back-up reset mechanism.

BACKGROUND

This section provides background information related to closure latch assemblies of the type used in motor vehicle closure systems and which is not necessarily prior art to the inventive concepts associated with the teachings of the present disclosure.

In an effort to meet consumer demand for motor vehicles equipped with closures systems providing advanced comfort and convenience features, many modern vehicles now include a passive keyless entry (PKE) system operable to permit locking and release of closure panels (i.e., side doors, sliding doors, liftgates, tailgates and decklids) without the use of a traditional manually-operated key-type entry system. Some of the most popular features now available with such vehicle closure systems include power locking/unlocking, power release and power cinching. Many of these "powered" features are provided by a closure latch assembly mounted to the moveable closure panel and which is typically equipped with a latch mechanism and one or more motor power-operated mechanisms interacting with the latch mechanism. These power-operated mechanisms may include, for example, a power latch release mechanism operable for selectively releasing the latch mechanism, a power lock mechanism operable for selectively locking the latch mechanism, and a power cinch mechanism operable for cinching the latch mechanism.

In many closure latch assemblies, the latch mechanism includes a ratchet and pawl arrangement configured to hold (i.e. "latch") the closure panel in a closed position by virtue of the ratchet being held in a striker capture position to retain a striker mounted to a structural body portion of the vehicle. The pawl is operable in a ratchet holding position to engage and mechanically hold the ratchet in one of two distinct striker capture positions, namely, a secondary or "soft close" striker capture position and a primary or "hard close" striker capture position. When the ratchet is held in its secondary striker capture position, the latch mechanism functions to latch the closure panel in a partially-closed position relative to the body portion of the vehicle. Likewise, when the ratchet is held in its primary striker capture position, the latch mechanism functions to latch the closure panel in a fully-closed position relative to the body portion of the vehicle. The latch mechanism is defined to be operating in a latched state when the ratchet is held in one of its striker capture positions.

To subsequently release (i.e. "unlatch") the closure panel for movement from either of its closed positions to an open position, the pawl is moved via actuation of the latch release mechanism from its ratchet holding position to a ratchet releasing position whereat the pawl is disengaged from the ratchet. Such shifting of the latch release mechanism form a non-actuated state into an actuated state functions to shift the latch mechanism from its latched state into an unlatched state. Upon disengagement of the pawl from the ratchet, a ratchet biasing arrangement functions to forcefully drive the ratchet from its striker capture position into a striker release position, thereby releasing the striker and allowing movement of the closure panel toward its open position.

In closure latch assemblies providing the power lock feature, a power lock actuator interacts with a lock mechanism for shifting the latch mechanism between locked and unlocked states. In closure latch assemblies providing the power cinch feature, a power cinch actuator interacts with a cinch mechanism for moving the ratchet from its secondary striker capture position into its primary striker capture position, thereby moving (i.e. "cinching") the closure panel from its partially-closed position to its fully-closed position. Likewise, in closure latch assembling providing the power release feature, a power release actuator interacts with the latch release mechanism for moving the pawl from its ratchet holding position into its ratchet releasing position so as to shift the latch mechanism from its latched state into its unlatched state. Typically, each of the above-noted power actuators includes an electric motor controlled by an electronic latch controller unit (i.e. Latch ECU) associated with the closure latch assembly.

In closure latch assemblies providing the power release feature, the latch release mechanism is normally maintained in its non-actuated state and is only shifted into its actuated state when sensors indicate a door release operation has been requested and authenticated by the PKE system (i.e. via actuation of a key fob or a handle-mounted switch). Actuation of the power release actuator is required for shifting the latch release mechanism from its non-actuated state into its actuated state. Following completion of the power release operation, when the sensors detect that the ratchet is located in its striker release position, the latch release mechanism must be "reset," that is, returned to its non-actuated state to permit subsequent latching of the latch mechanism upon movement of the closure panel from its open position into one of its closed positions. Resetting of the latch release mechanism is normally accomplished via the power release actuator. However, some closure latch assemblies are equipped with a manually-operated mechanical "backup" reset mechanism that can be actuated in response to a loss of electrical power (i.e. no battery power and the superconductor (SC) backup energy is depleted) for manually resetting the latch release mechanism into its non-actuated state.

To prevent precipitation and road debris from entering the vehicle, all closure panels are equipped with a resilient weather seal around its peripheral edge and which is configured to seal against a mating surface of the vehicle body. The weather seal also functions to reduce the transmission of road and wind noise into the passenger compartment. Since the weather seal is made from an elastomeric material, it compresses upon closing of the closure panel and is maintained in this compressed state via the closure latch assembly holding the closure panel in its fully-closed position. As is well recognized, increasing the compressive clamping force applied to the weather seal results in improved noise reduction with the interior passenger compartment. However, holding the weather seal in a highly compressed condition tends to bias the closure panel toward its open position such that this "opening" seal force is resisted by the pawl in its ratchet holding position and the ratchet in its primary striker capture position. Because the seal loads exerted on the latch mechanism are increased, the "release"

force required to actuate the latch release mechanism for moving the pawl out of latched engagement with the ratchet and into its ratchet releasing position is also increased, thereby impacting the size and power requirements of the power release actuator. In addition, an audible sound, commonly referred to as "popoff" noise, is sometimes generated following actuation of the latch release mechanism and subsequent release of the latch mechanism due to the physical engagement between the striker and the ratchet caused by release of the compressive seal loads as the ratchet is driven from its primary striker capture position toward its striker release position.

To address the compromise between the desire for higher seal loads and lower latch release forces, it is known to provide the closure latch assembly with an arrangement configured to coordinate the release of the seal loads with powered release of the latch mechanism. In this regard, some closure latch assemblies are equipped with an alternative latch mechanism such as, for example, a dual pawl/ratchet type of latch mechanism configured to use the mechanical advantage of the additional pawl/ratchet arrangement to reduce the required latch release force. As another alternative, European Publication No. EP1176273 disclosed a power-operated latch release mechanism configured to provide a progressive release of the ratchet associated with the latch mechanism in an effort to reduce the popoff noise. As a further alternative, European Publication No. EP 0978609 discloses an eccentric latch release mechanism used in association with the latch mechanism to reduce the seal loads prior to release of the ratchet. It is also known to equip the closure latch assembly with a secondary or "safety" latch mechanism which only interacts with the latch mechanism in the event of a crash situation in order to prevent unintended release of the latch mechanism. Obviously, the inclusion of such additional mechanisms into the closure latch assembly, while providing a desirable feature, significantly impacts the complexity and packaging requirements.

Most closure latch assemblies providing power release functionality are equipped with a power actuator having an electric motor and a geartrain configured to actuate the latch release mechanism. In addition to operation during normal power release conditions, the power release actuator must also be capable of actuating the latch release mechanism via discharge of the Supercapacitor (9V) during increased "post-crash" seal load conditions (i.e. 1.5 KN-5.0 KN). Unfortunately, with some traditional single pawl/ratchet latch mechanisms, the power release actuator cannot generate the required mechanical advantage to fulfill the increased SC power release requirements at the higher portion of the crash seal load range. In these specific vehicular applications, the latch mechanism typically employed is the dual pawl/ratchet configuration providing reduced release force requirements with a concomitant increase in release time. Obviously, closure latch assemblies equipped with such dual pawl/ratchet types of latch mechanisms are more complex and expensive compared to a conventional single-type latch mechanism.

While current closure latch assemblies of the type used in motor vehicle closure systems are sufficient to meet customer and regulatory requirements, a recognized need exists to design and develop alternative power release actuators for use with single pawl/ratchet latch mechanisms that advance the technology and further address and overcome at least some of the known shortcomings.

SUMMARY

This section provides a general summary of various inventive concepts associated with the teachings of the present disclosure. However, this section is not intended to be considered an exhaustive and comprehensive listing of all aspects, features, objectives, and possible embodiments associated with present disclosure.

In one aspect, a latch is provided, including: a multi-stage geartrain, wherein the multi-stage geartrain operatively couples an output of a motor of a power release actuator to a pawl of a latch release mechanism; wherein an output of multi-stage geartrain is decoupled from the pawl until after the multi-stage gear mechanism has developed inertia in response to actuation of the motor; wherein the pawl has a ratchet holding position whereat the pawl holds a ratchet in a latched state and a ratchet releasing position whereat the ratchet is an unlatched state; wherein, after developing inertia in response to actuation of the motor, the output of the multi-stage geartrain contacts the pawl and pivots the pawl from the ratchet holding position to the ratchet releasing position.

In one aspect, the multi-stage geartrain includes a first gear in meshed engagement with a second gear, wherein the first gear is a compound gear and the second gear is a sector gear.

In one aspect, the compound gear includes a worm wheel in meshed engagement with a worm gear, wherein the worm gear is disposed on an output shaft of the motor.

In one aspect, the sector gear includes an arm extending radially outward therefrom.

In one aspect, the arm is disposed in the same plane as the geartrain such that the arm is disposed within an axial height defined by the geartrain.

In one aspect, the arm has a curvature configured to act as a cam.

In one aspect, the arm includes a first curved surface that contacts the pawl and pivots a position of the pawl in response to a first range of rotational movement of the sector gear, and the arm includes a second curved surface that contacts the pawl and maintains the position of the pawl in response to a second range of rotational movement of sector gear that is beyond the first range.

In one aspect, the pawl includes a first leg segment extending in a first direction from a pivot axis of the pawl and a second leg segment extending in a second direction opposite the first direction from the pivot axis of the pawl, wherein the first leg segment is longer than the second leg segment.

In one aspect, the second leg segment includes a latch shoulder configured to contact the ratchet to hold the ratchet when the pawl is in the ratchet holding position, and the first leg segment includes a cam surface, wherein the arm extending from the sector gear contacts the cam surface to pivot the pawl away from the ratchet holding position.

In one aspect, the arm includes a first cam region and a second cam region, wherein the first cam region extends within a first radius of sector gear, wherein the second cam region extends between the first radius and a second radius that is greater than the first radius.

In one aspect, the second radius is greater than the maximum radius of the sector gear such that the arm extends beyond the radius of the sector gear.

In one aspect, the latch includes a printed circuit board ("PCB"), wherein PCB includes a plurality of hall sensors configured to detect the position of the sector gear, pawl, and/or the ratchet.

In one aspect, torque of the output of the geartrain increases following initial contact between the arm and the pawl and during further rotation of the sector gear.

In one aspect, the latch includes a manual release mechanism including a manual release lever having a manual release arm, wherein the pawl includes a boss disposed at an end of the pawl, wherein the manual release arm is spaced away from the boss and defines a gap when in a rest position, and wherein the manual release arm rotates toward the boss in response to manual actuation, wherein the manual release arm contacts the boss to pivot the pawl away from the ratchet holding position after the manual release arm rotates through the gap, wherein the manual release lever is coaxial with the sector gear and rotatable independently relative to the sector gear.

In one aspect, the latch includes a mechanical backup reset mechanism configured to permit manual movement of the sector gear from an end of travel position back to its home position for backdriving the geartrain and manually resetting the power release actuator into its non-actuated state.

In one aspect, the first gear and the second gear are mounted to an actuator housing that is separate from a latch plate, wherein the pawl and ratchet are mounted to the latch plate.

In another aspect, a method of controlling operation of a closure latch assembly is provided. The method includes the steps of: providing a closure latch assembly having a multi-stage geartrain, a power release actuator, a pawl, and a ratchet, wherein an output of the multi-stage geartrain is decoupled from the pawl in a rest position prior to actuation of the power release actuator, wherein the pawl has a ratchet holding position wherein the pawl holds the ratchet in a latched state and a ratchet releasing position wherein the pawl allows the ratchet to pivot to an unlatched state; actuating the power release actuator; pivoting the output of the geartrain through a degree of rotation prior to contacting the pawl and developing inertia; after developing inertia, contacting the pawl with the output of the multi-stage geartrain; after contacting the pawl, continuing to pivot the output of the geartrain and pivoting the pawl out of the ratchet holding position and into the ratchet releasing position.

In one aspect, the geartrain includes a first gear in the form of a compound gear in meshed engagement with a second gear in the form of a sector gear, wherein the sector gear includes an arm extending radially therefrom, wherein the arm is the output of the geartrain and contacts the pawl to pivot the pawl in response to contact therebetween.

In one aspect, a contact point defined between the arm and the pawl increases in a radially outward direction in response to continued rotation of the arm and pivoting of the pawl, wherein the contact point between the arm and the pawl at an end of travel position of the sector gear has a radius greater than a maximum radius of the sector gear.

In one aspect, the geartrain defines an axial height and the arm is disposed axially within the height of the geartrain.

It is an aspect of the present disclosure to provide a closure latch assembly for use with a motor vehicle closure panel system and which is equipped with a power-operated latch release mechanism operable for selectively shifting a single pawl/ratchet latch mechanism from a latched state into an unlatched state to provide power release functionality.

It is a related aspect of the present disclosure to configure the power-operated latch release mechanism of the closure latch assembly to include a power release actuator operable to generate increased latch release forces that are capable of shifting the single pawl/ratchet latch mechanism from its latched state into its unlatched state during high load conditions.

It is another related aspect of the present disclosure to configure the power release actuator to generate the increased latch release loads required to shift the single pawl/ratchet latch mechanism into its unlatched state in response to actuation of the power release actuator via a backup power supply to overcome high seal load conditions associated with a post-crash event.

It is another related aspect of the present disclosure to configure the power release actuator to include an electric motor and a dual-stage geartrain driven by the electric motor and which provides an increased output torque multiplication for generating the increased latch release forces while shifting the single pawl/ratchet latch mechanism from its latched state into its unlatched state within acceptable latch release time requirements.

It is a further related aspect of the present disclosure to configure the dual-stage geartrain to establish a first stage torque transmission ratio between a motor-driven worm gear and a first transfer gear associated with a compound gear and to establish a second stage torque transmission ratio between a second transfer gear associated with the compound gear and a power release gear that is adapted to directly or indirectly exert the latch release force on the single pawl/ratchet latch mechanism.

It is yet another related aspect of the present disclosure to provide the power release gear with a power release cam adapted to selectively engage a pawl release cam on the pawl of the single pawl/ratchet latch mechanism for moving the pawl from a ratchet holding position whereat the pawl holds the ratchet in a striker capture position to a ratchet releasing position whereat the pawl is disengaged from the ratchet to permit the ratchet to move from its striker capture position to a striker release position in response to the power release gear being rotated by the electric motor and the dual-stage geartrain from a home position to a pawl released position.

In accordance with another aspect of the present disclosure, the closure latch assembly further includes a manually-operated latch release mechanism operable for selectively shifting the single pawl/ratchet latch mechanism from its latched state into its unlatched state independently of actuation of the power-operated latch release latch mechanism.

In a related aspect, the manually-operated latch release mechanism includes a backup release lever interconnected via a cable actuation assembly to a door handle and having a manual release cam adapted to selectively engage a pawl release boss on the pawl of the single pawl/ratchet latch mechanism for selectively moving the pawl from its ratchet holding position into its ratchet releasing position in response to actuation of the door handle.

In accordance with a further related aspect of the present disclosure, the power release gear of the power-operated latch release mechanism and the backup release lever of the manually-operated latch release mechanism are coaxially aligned for independent movement about a common axis. In addition, the power release cam associated with the power-operated latch release mechanism and the manual release cam associated with the manually-operated latch release mechanism are arranged in a stacked configuration so as to selectively engage with a corresponding one of the pawl release cam and the pawl release boss formed on the pawl of the single pawl/ratchet latch mechanism.

In accordance with yet another aspect of the present disclosure, the closure latch assembly further includes a mechanical backup reset mechanism for permitting the power actuator to be manually reset from an actuated state following completion of the power release operation into a non-actuated state.

In accordance with another aspect of the present disclosure, methods are provided for actuation of the power-operated latch release during the power release operation, for manually resetting of the power release actuator via the backup reset mechanism, and for actuating the manually-operated latch release mechanism.

These and other aspects of the disclosure are provided by a closure latch assembly for a vehicle closure panel, comprising: a latch mechanism having a ratchet moveable between a striker capture position and a striker release position, a pawl moveable between a ratchet holding position whereat the pawl engages and holds the ratchet in its striker capture to define a latched state and a ratchet releasing position whereat the pawl is disengaged form the ratchet for permitting movement of the ratchet to its striker release position to define an unlatched state, a ratchet biasing member for biasing the ratchet toward its striker release position, and a pawl biasing member for biasing the pawl toward its ratchet holding position; a power-operated latch release mechanism operable in a non-actuated state to maintain the pawl in its ratchet holding position and in an actuated state to move the pawl from its ratchet holding position to its ratchet releasing position, the power-operated latch release mechanism including an electric motor and a dual-stage geartrain configured to generate a latch release force that is adapted to be exerted on the pawl for shifting the latch mechanism into its unlatched state, the dual stage geartrain including a worm gear driven by the electric motor, a power release gear adapted to exert the latch release force on the pawl, and a compound gear having a first transfer gear meshed with the worm gear to establish a first stage torque transmission ratio and a second transfer gear meshed with the power release gear to establish a second stage torque transmission ratio; and a latch controller for controlling actuation of the electric motor when a power release signal is detected and authenticated.

Further areas of applicability will become apparent from the following detailed description when considered in conjunction with the accompanying drawings. As noted, the general descriptions and specific examples set forth in this summary are intended only to identify certain inventive concepts and features associated with the present disclosure and are not to be interpreted to unduly limit the fair and reasonable scope of the present disclosure.

DRAWINGS

These and other aspects, features, objectives, and advantages of the present disclosure will be readily appreciated, as the same become better understood, by reference to the following detailed description when considered in connection with the accompanying drawings wherein.

Figure 17:
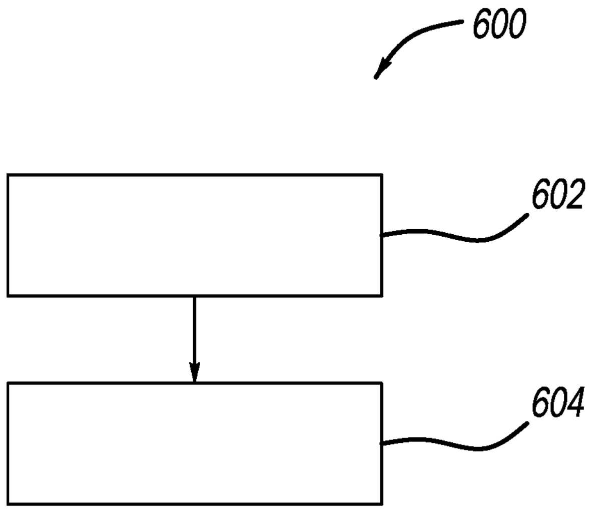

FIG. 17. Illustrates a method for manually resetting the power release actuator via manual actuation of a backup reset mechanism associated with the closure latch assembly of the present disclosure; and FIGS. 18A to 18D illustrate a series of views showing an engagement of pawl release lug with a multiple different regions of power release cam and different rotation positions of power release gear.

DETAILED DESCRIPTION

Example embodiments of a closure latch assembly constructed according to the teachings of the present disclosure will now be described more fully with reference to the accompanying drawings. To this end, the example embodiments are provided so that this disclosure will be thorough, and will fully convey its intended scope to those who are skilled in the art. Accordingly, numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the present disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be terms a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotate 90 degrees or at other orientations) and the spatially relative descriptors used herein interpreted accordingly.

In the following detailed description, the expression "closure latch assembly" will be used to generally indicate any power-operated latch device adapted for use with a vehicle closure panel to provide a power latch release function. Additionally, the expression "closure panel" will be used to indicate any element moveable between an open position and at least one closed position, respectively opening and closing an access to an inner compartment of a motor vehicle and therefore includes, without limitations, decklids, tailgates, liftgates, bonnet lids, and sunroofs in addition to the sliding and pivoting passenger doors of a motor vehicle to which the following description will make explicit reference, purely by way of example.

Figure 1:
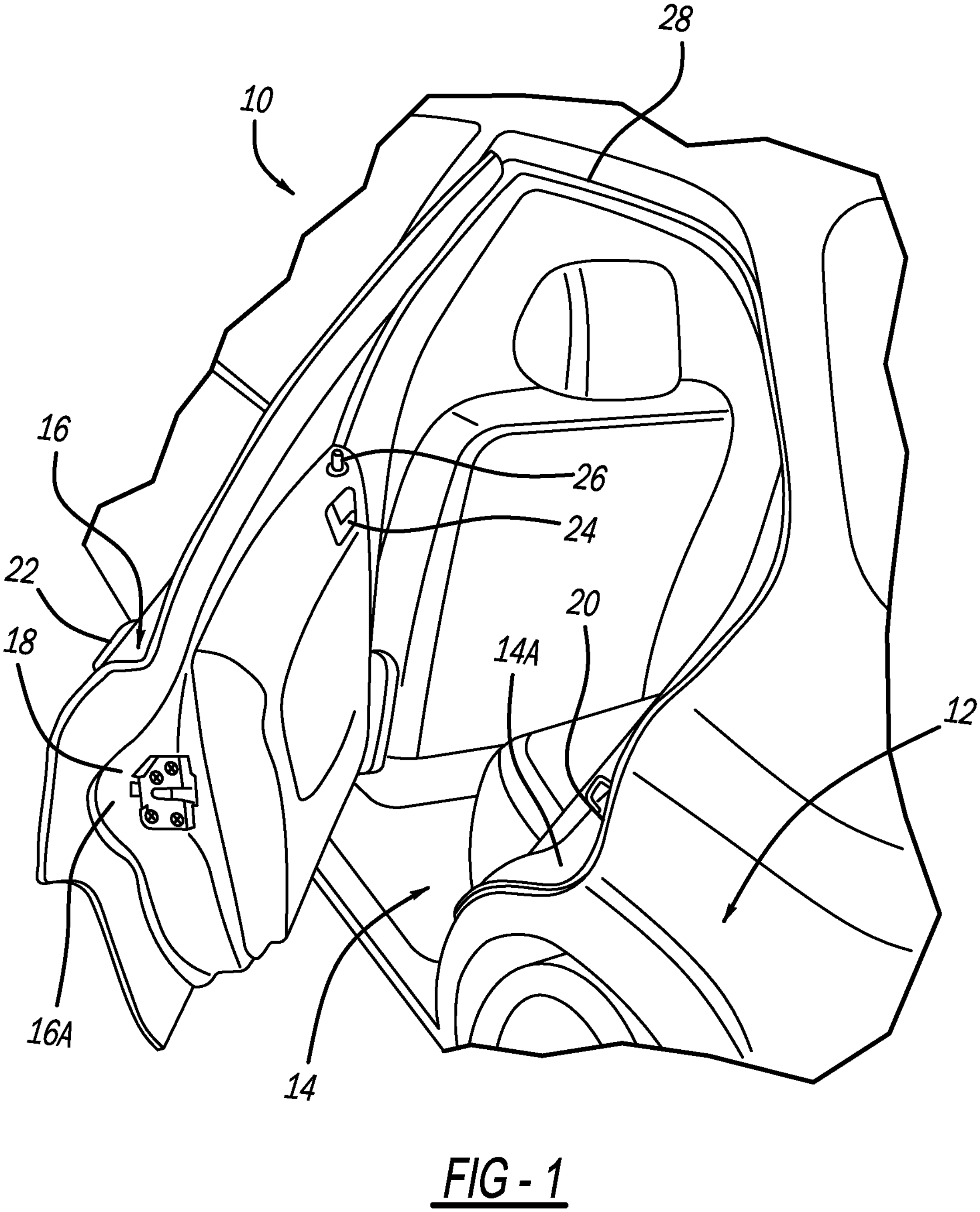
FIG. 1 is a partial isometric view of a motor vehicle having a closure panel equipped with a closure latch assembly constructed in accordance with the teachings of the present disclosure.

Referring initially to FIG. 1 of the drawings, a motor vehicle 10 is shown to include a vehicle body 12 defining an opening 14 providing access to an interior passenger compartment. A closure panel 16 is pivotably mounted to vehicle body 12 for swinging movement between an open position (shown) and a fully-closed position to respectively open and close opening 14. A closure latch assembly 18 is rigidly secured to closure panel 16 adjacent to an edge portion 16A thereof and is releaseably engageable with a striker 20 that is fixedly secured to vehicle body 12 adjacent to a recessed edge portion 14A of opening 14. As will be detailed, closure latch assembly 18 is operable to engage striker 20 and hold (i.e. "latch") closure panel 16 into its fully-closed position. An outside handle 22 and an inside handle 24 are provided for actuating closure latch assembly 18 to release striker 20 and permit subsequent movement of closure panel 16 to its open position. An optional lock knob 26 is shown which provides a visual indication of the locked state of a lock mechanism associated with closure latch assembly 18 and which may also be operable to mechanically change the locked state of closure latch assembly 18. A weather seal 28 is shown mounted on edge portion 14A of opening 14 in vehicle body 12 and is adapted to be resiliently compressed upon engagement with a mating sealing surface of closure panel 16 when closure panel 16 is held by closure latch assembly 18 in its fully-closed position so as to provide a sealed interface therebetween. This sealed interface is configured to prevent entry of rain and dirt into the passenger compartment while also minimizing audible wind and road noise. For purpose of clarity and functional association with motor vehicle 10, the closure panel is hereinafter referred to as door 16.

Figure 2:
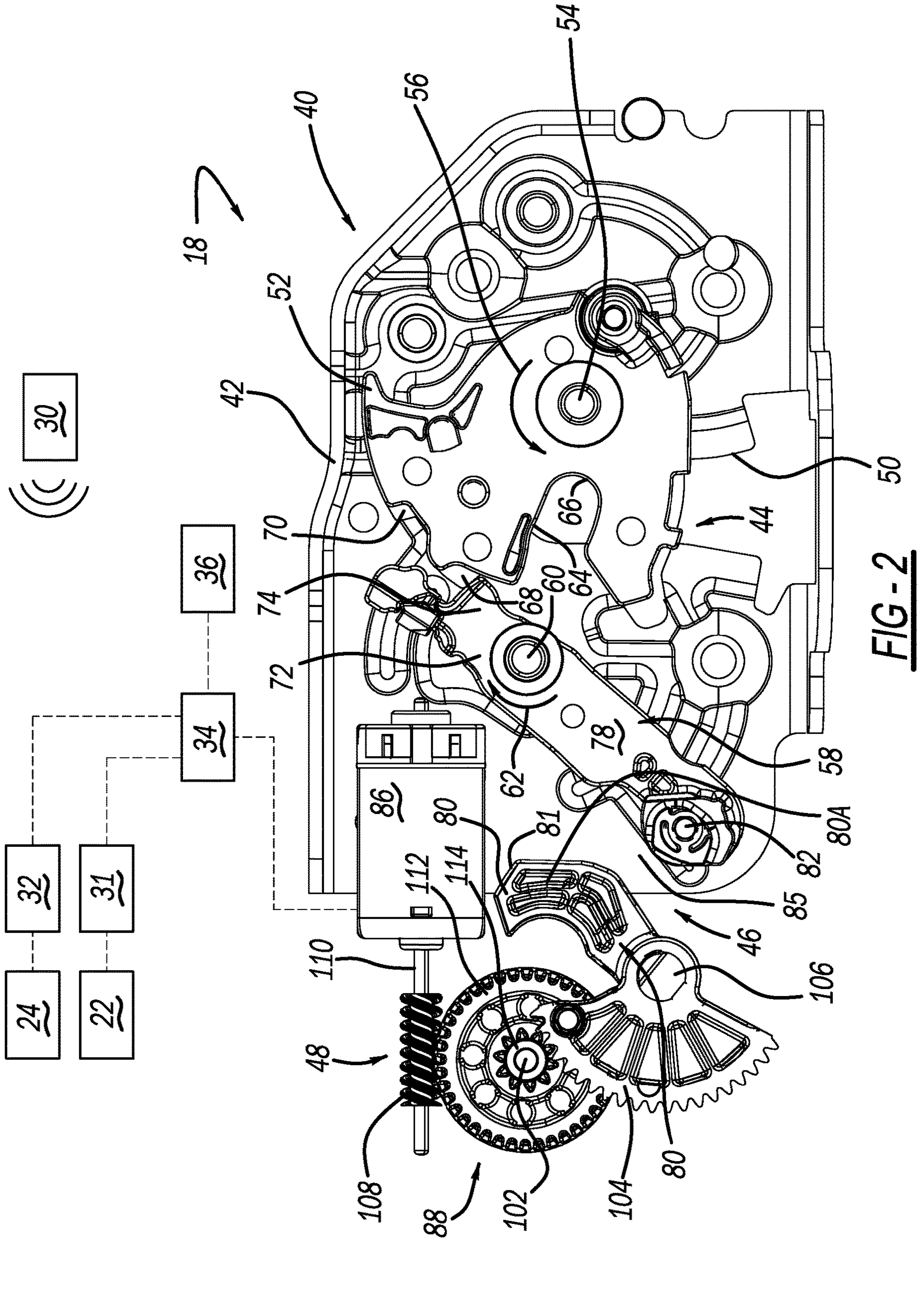
FIG. 2 is a plan view of a strength module associated with the closure latch assembly of the present disclosure and which is shown in association with a latch mechanism, a latch release mechanism, and a power release actuator configured to actuate the latch release mechanism to provide a “power” release of the latch mechanism.

Referring now primarily to FIG. 2, closure latch assembly 18 is shown to generally include a strength module 40 having a latch plate 42, a latch mechanism 44, a latch release mechanism 46, and a power release actuator 48. Latch plate 42 is a structural component and is configured to include a fishmouth entry channel 50 through which striker 20 moves in response to door 16 moving between its fully-closed and open positions. Latch mechanism 44 is configured as a single pawl/ratchet arrangement and generally includes a ratchet 52 supported for pivotal movement relative to latch plate 42 about a ratchet pivot post 54, a ratchet biasing spring (indicated by arrow 56), a pawl 58 supported for pivotal movement relative to latch plate 42 about a pawl pivot post 60, and a pawl spring 62 (see FIG. 3). Ratchet 52 is configured to include a striker guide slot 64 which terminates in a striker capture cavity 66, a primary latch notch 68 and a secondary latch notch 70. As will be further detailed, ratchet 52 is moveable about ratchet pivot post 54 between a striker release position (FIGS. 9-11) whereat striker 20 is released from strike guide slot 64 when door 16 is located in its open position, a secondary striker capture position (FIG. 3) whereat striker 20 is retained within guide slot 64 when door 16 is held in its partially-closed position, and a primary striker capture position (FIGS. 2 and 5-8) whereat striker 20 is retained within striker capture cavity 66 when door 16 is held in its fully-closed position. Ratchet spring 56 is configured to normally bias ratchet 52 toward its striker release position.

Pawl 58 is configured to include a first elongated leg segment 78 and a second leg segment 72 which are located on opposite sides of pawl pivot post 60. Second leg segment 72 defines a latch shoulder 74. Pawl 58 is moveable about pawl pivot post 60 between a ratchet releasing position (FIGS. 9-11) whereat pawl latch shoulder 74 is released from engagement with both secondary latch notch 70 and primary latch notch 68 on ratchet 52 so as to permit ratchet spring 56 to move ratchet 52 to its striker release position, and a ratchet holding position (FIGS. 2, 3, and 5-8) whereat pawl latch shoulder 74 engages one of secondary latch notch 70 (FIG. 3) and primary latch notch 68 (FIGS. 2 and 5-8) on ratchet 52 so as to mechanically hold ratchet 52 in a corresponding one of its secondary striker capture position (FIG. 3) and its primary striker capture position (FIGS. 2 and 5-8). Pawl spring 62 is operable to normally bias pawl 58 toward its ratchet holding position. Latch mechanism 44 is defined to be operating in a first or "unlatched" state when pawl is located in its ratchet releasing position and ratchet 52 is released to move toward its striker release position, and in a second or "latched" state when ratchet 52 is held in one of its primary and secondary striker capture positions via pawl 58 being located in its ratchet holding position.

Figure 15A:
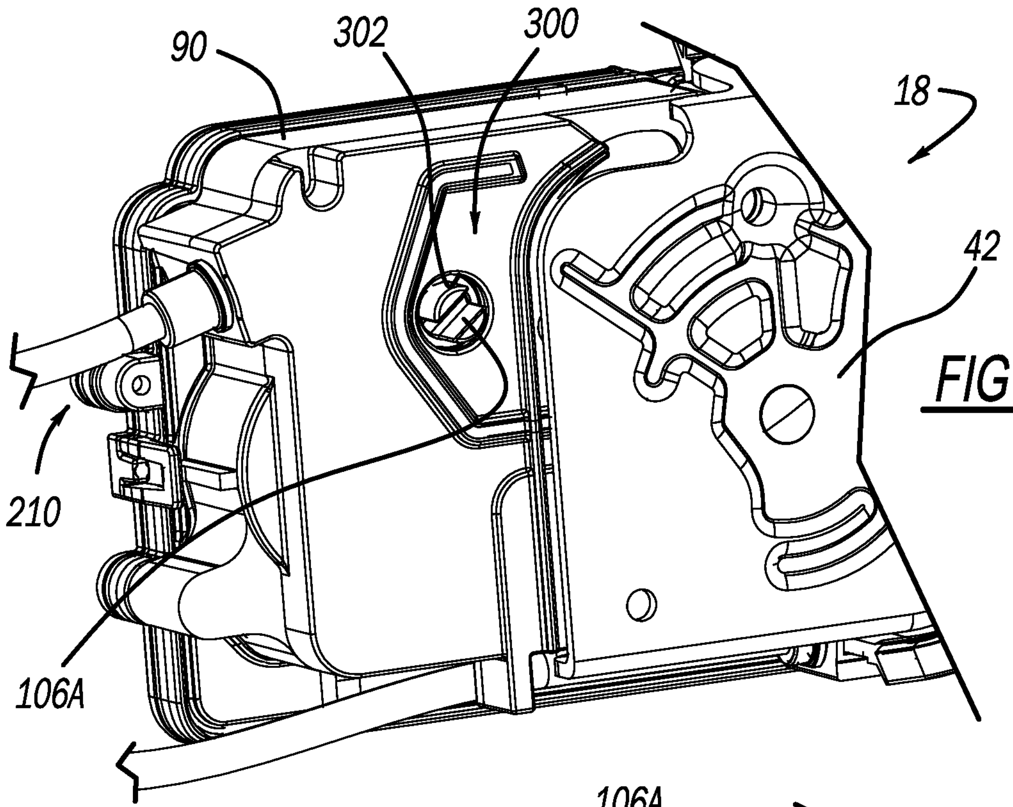
FIGS. 15A through 15C illustrate a mechanical backup reset mechanism associated with the latch release mechanism and the power release actuator of the closure latch assembly of the present disclosure.

With continued reference to the drawings, latch release mechanism 46 is shown, in this non-limiting embodiment, to generally include a power release cam 80 and a pawl release lug 82. Likewise, power release actuator 48 is shown, in this non-limiting embodiment, to generally include an electric motor 86 and a dual-stage geartrain 88. Latch release mechanism 46 and power release actuator 48 are mounted within an actuator housing 90 (best shown in FIGS. 15A and 15B) and which is adapted to be secured in latch plate 42. In one aspect, the gears of geartrain 88 described further below, are mounted to actuator housing 90, which may be plastic, and are not mounted to the latch plate 42 or frame plate. FIGS. 15F and 15G illustrate gears 100 and 104 being mounted to housing 90.

Figure 3:
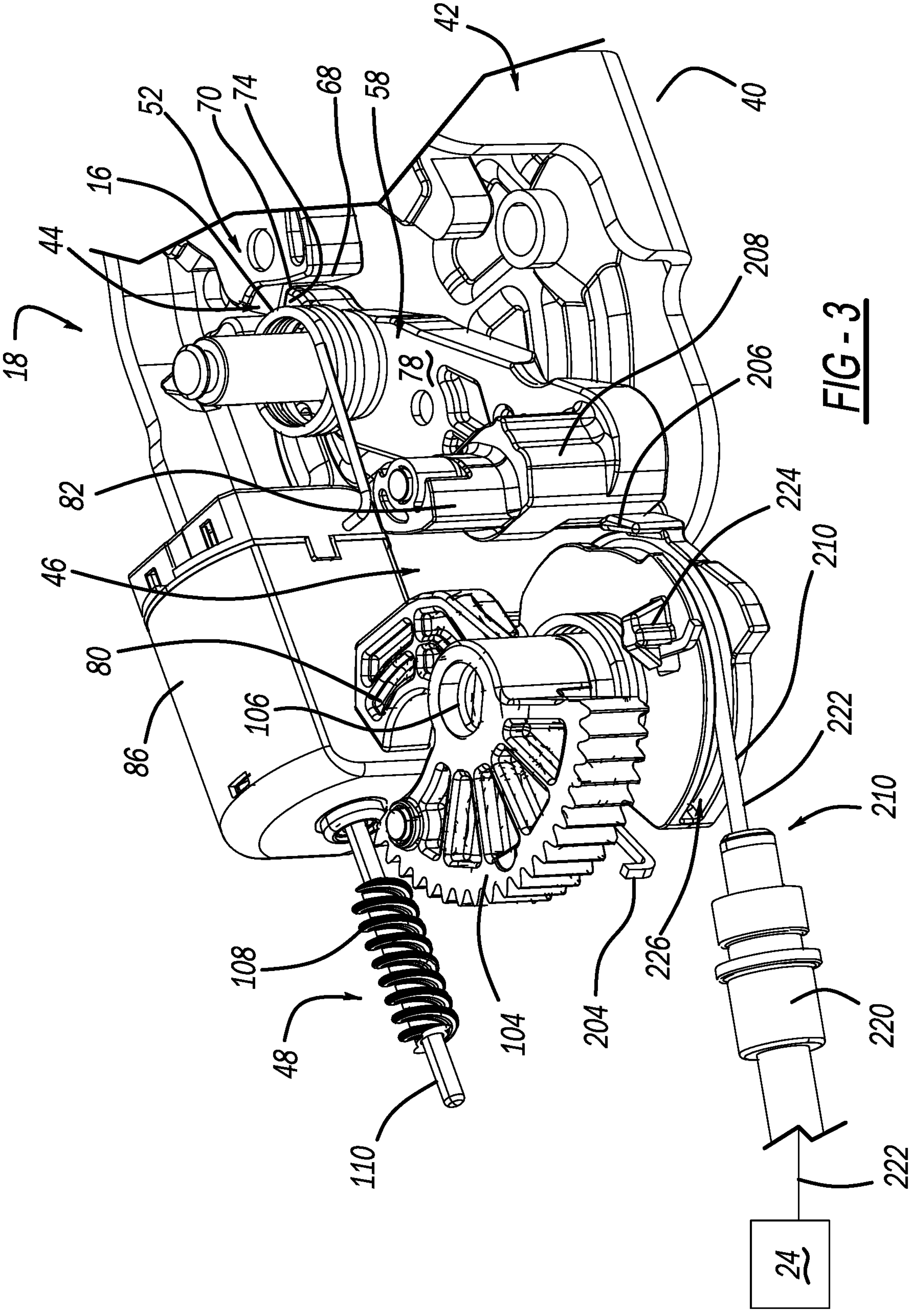
FIG. 3 is a partial isometric view of the closure latch assembly further illustrating an inside (IS) manually-operated latch release mechanism configured to provide a “manual” release of the latch mechanism via an inside handle.
Figure 3A:
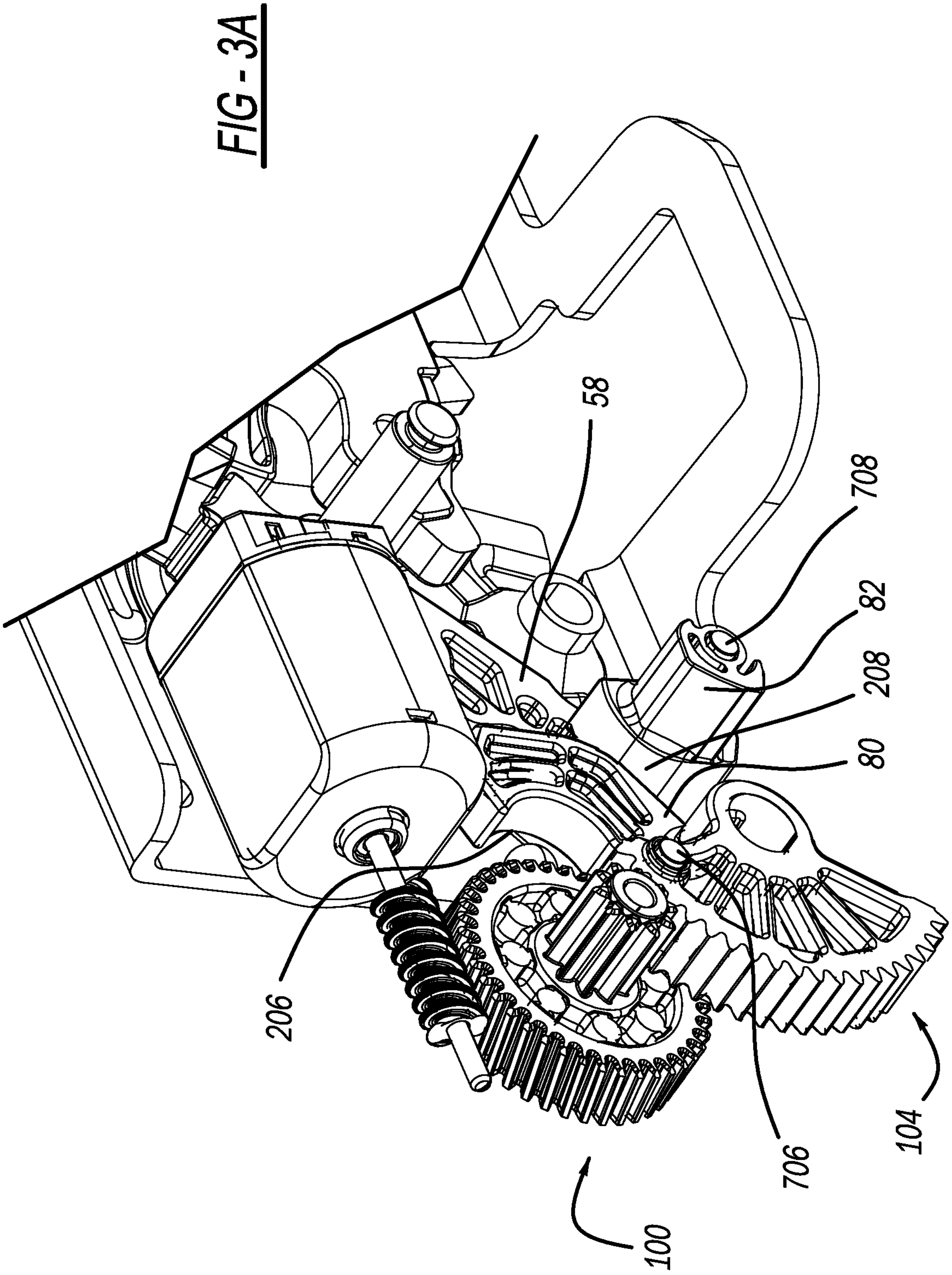
FIG. 3A is another partial isometric view of the closure latch assembly.
Figure 3B:
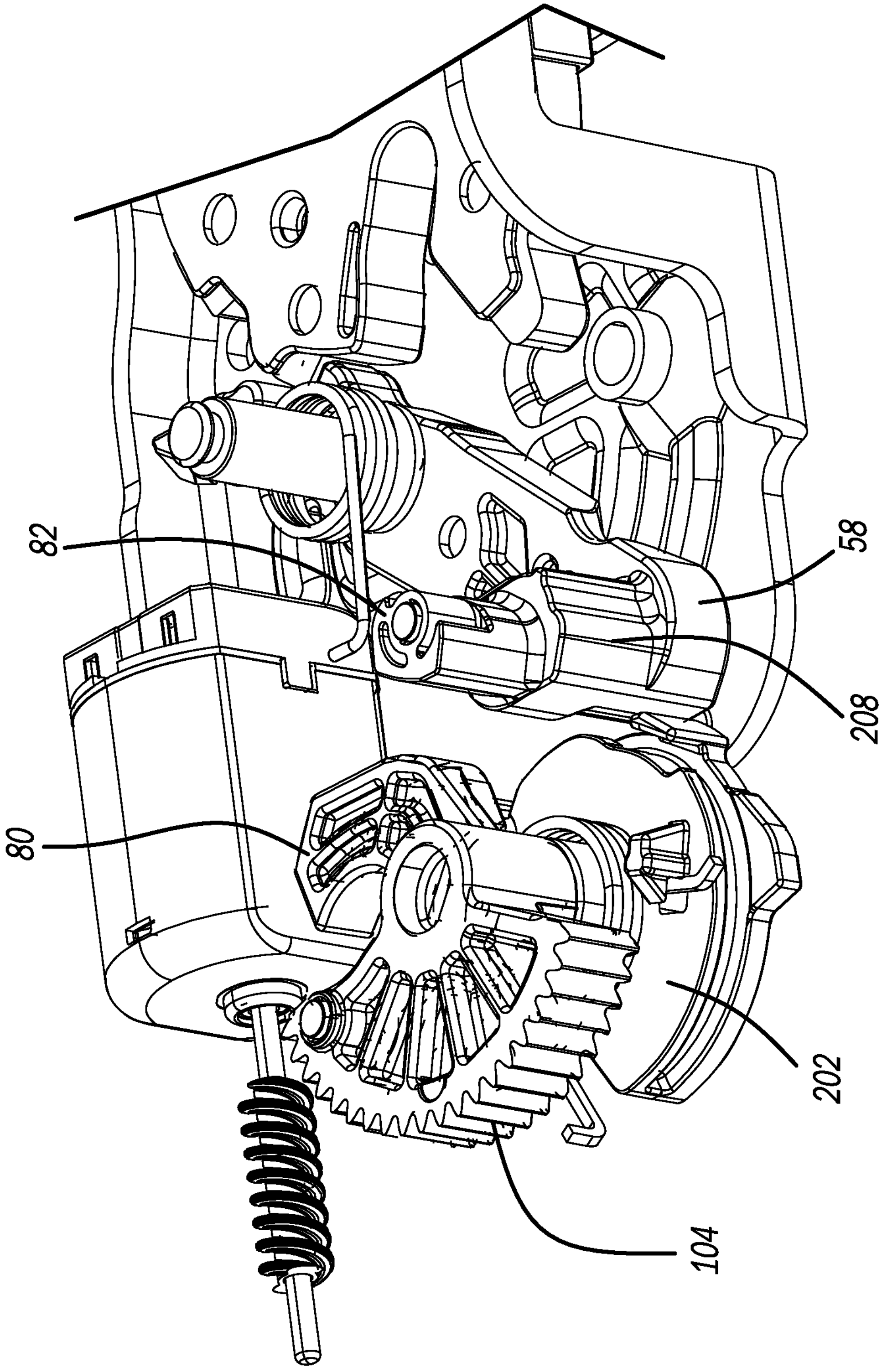
FIG. 3B is another partial isometric view of the closure latch assembly.
Figure 3C:
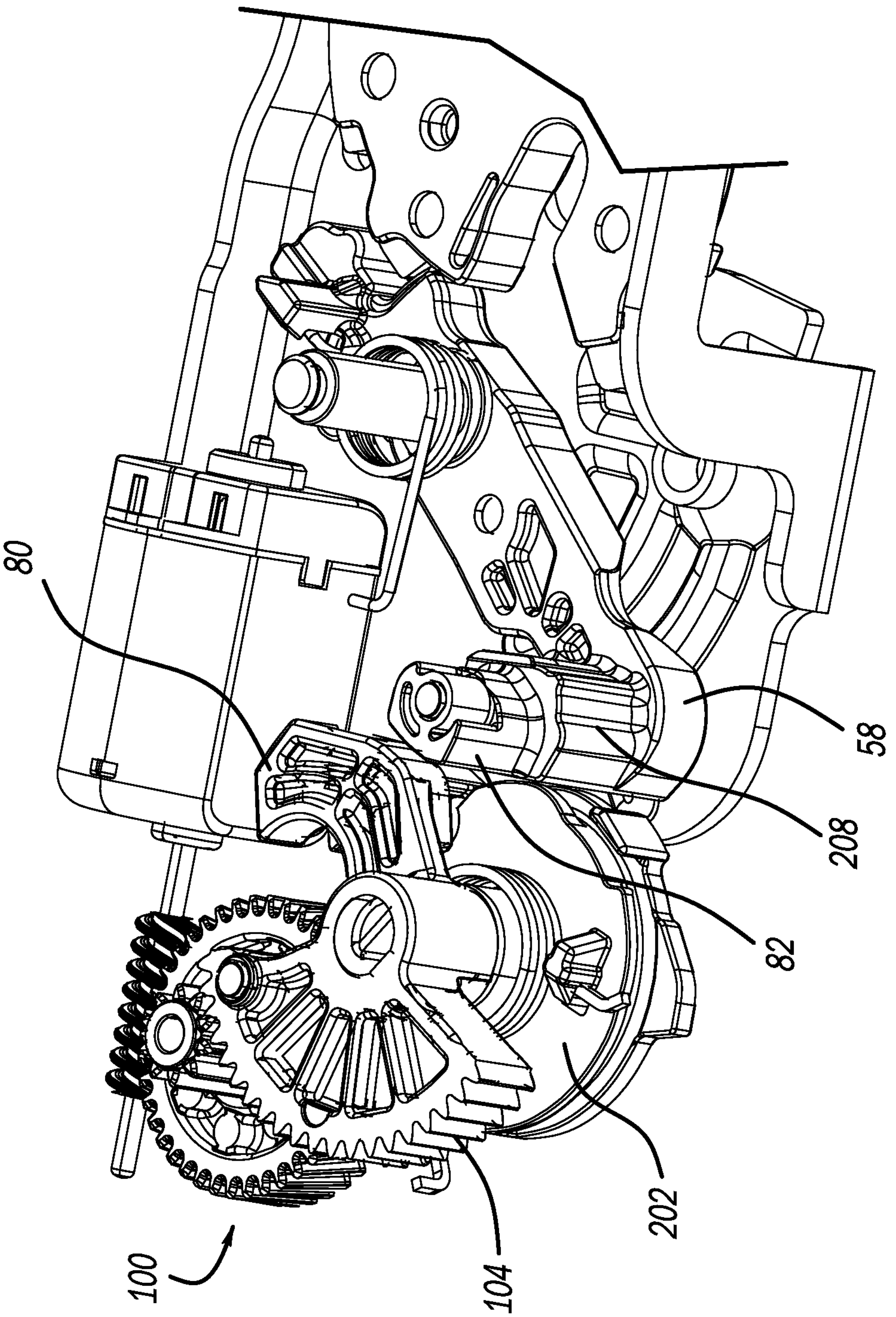
FIG. 3C is another partial isometric view of the closure latch assembly.

Pawl release lug 82 extends axially an end of pawl 58, which can be seen in FIG. 3, as well as other figures herein. Pawl release lug 82 is disposed generally in the same plane as sector gear 104 and power release cam 80 (which may also be referred to as arm 80). FIG. 3 further illustrates a backup release or manual release mechanism, which is described in further detail below. Manual release cam 206 is in the same plane as boss 208, which also extends axially from the end of the pawl 58. As seen in FIG. 3, pawl release cam 82 is disposed above boss 208. Similarly, power release cam 80 is disposed above backup release cam 206. FIGS. 3A-3C provide additional views of arm 80, cam 206, lug 82, and boss 208.

With reference again to FIG. 2, dual-stage geartrain 88 (also referred to as multi-stage geartrain) includes a compound gear 100 (including a small diameter portion disposed above a large diameter portion) mounted for rotation about a first gear post 102, a power release gear 104 mounted for rotation about a second gear post 106, and a drive gear 108 rotatably driven by a motor shaft 110 of electric motor 86. In accordance with the illustrated configuration, the power release gear 104 is a sector gear having a portion of a gear wheel, with power release cam 80 extending radially outward from the sector gear. Sector gear 104 is in meshed engagement with small diameter portion of compound gear 100, and drive gear 108 is in meshed engagement with large diameter portion of compound gear 100.

Dual-stage geartrain 88 provides a variety of advantages. Cam 80 extends radially outward from sector gear 104 in the same plane as the geartrain 88. In one aspect, cam 80 is in the same plane as the sector gear 104. In one aspect, the cam 80 is disposed in the axial space defined by the compound gear 100. In one aspect, the cam 80 axially overlaps both the compound gear 100 and the sector gear 104. In each of these aspects, cam 80 is not disposed above sector gear 104 and does not add axial height to the geartrain 88 defined by the compound gear 100 and the sector gear 104. Accordingly, the axial height of the components is reduced, thereby reducing packaging size. Additionally, the use of a sector gear 104 with a radially extending arm for the cam 80 reduces the weight of components.

Moreover, with the arm extending form the sector gear 104, the arm of the cam 80 can extend to greater radius or have a greater radial length than the gear 104 itself, allowing for torque to increase at contact points corresponding to points greater than the radius of the gear. Put another way, the radius or sector portion of the gear 104 may be reduced relative to the arm 80 without sacrificing the amount of available torque that can be applied by the arm 80 on the pawl 58.

Drive gear 108 is configured, in the non-limiting embodiments, as a worm gear, driven by motor 86 and directly engaged with outermost teeth of compound gear 100. Compound gear 100 is configured, in the non-limiting embodiments, to include a first large-diameter transfer gear 112 and a second small-diameter transfer gear 114 which are interconnected for common rotation about a rotary axis defined by first gear post 102. In one aspect, gears 112 and 114 are fixed relative to each other. First transfer gear 112 is configured, in the non-limiting embodiments, to define a helicoidal gear (or worm wheel) with helical gear teeth meshed with threads of worm gear 108. Second transfer gear 114 is configured as a spur gear having spur gear teeth. Power release gear 104 (also known as sector gear 104) is also configured as a spur gear having its spur gear teeth in constant mesh with the spur gear teeth on second transfer gear 114 of compound gear 100, and is supported for rotation about the rotary axis defined by second gear post 106.

In one aspect, gear posts 102 and 106 are fixed to actuator housing 90, such that compound gear 100 and power release gear 104 are attached to actuator housing 90 rather than latch plate 42. Such attachment is illustrated in FIGS. 15F and 15G In accordance with the teachings of the present disclosure, dual-stage geartrain 88 works, in cooperation with electric motor 86, to generate an increased latch release output force of a magnitude required to provide powered release of latch mechanism 44 (via latch release mechanism 46) during high seal load conditions such as, for example, occurring as part of a post-crash situation. In addition to generating the increased latch release force levels, power release actuator 48 is capable of meeting latch release time values in compliance with customer and regulatory requirements. To provide these advantages, the geared interaction between worm gear 108 and first transfer gear 112 of compound gear 100 establishes a first speed ratio and torque multiplication factor while the geared interaction between second transfer gear 114 of compound gear 100 and power release gear 104 establishes a second speed ratio and torque multiplication factor which, when combined, provide a dual-stage speed/torque transmission ratio between motor shaft 110 and power release gear 104. As is clearly shown, power release cam 80 is fixed to, or integrally formed with, power release gear 104 while pawl release lug 82 is fixed to, or integrally formed with, an end portion of first leg segment 78 of pawl 58. Illustratively and in accordance with one possible configuration, the power release cam 80 extends from the power release gear 104 within the same plane as the power release gear 104 and within the missing portion of a gear wheel partly defining the sector gear configuration of the power release gear 104. This rotation of power release gear 104 in a first or "releasing" direction (i.e. clockwise in FIG. 2) from a first or "home" position to a second or "pawl released" position causes power release cam 80 to engage pawl release lug 82 and forcibly move pawl 58 from its ratchet holding position to its ratchet releasing position. In another aspect, cam 80 may be disposed in axial overlap with compound gear 100.

As shown in FIG. 2, according to an aspect, power release cam 80 extends radially outward from the sector gear shape of power release gear 104, with the power release cam defining a curvature. in one aspect, the curvature of the power release cam 80 is a varying curvature, allowing for a varying curvature to act on power release pawl 58. The power release cam 80 includes a first curved surface that faces toward pawl 58 and which is configured to come into contact with pawl 58, and further includes a second curved surface that faces away from pawl 58, and is not configured for contact with pawl 58.

FIG. 2 illustrates a rest position of latch assembly 18, with pawl 58 holding ratchet 52 in striker capture position. In the illustrated rest position of the latch assembly 18, a gap 85 is defined between the power release cam 80 and the power release lug 82 of the pawl 58. The gap 85 provides multiple advantages in the illustrated latch assembly 18. In one aspect, the gap 85 allows the motor 86 to actuate gear train 88 to gain inertia initially during actuation without having to also actuate and move the pawl 58. Put another way, the gear train 88 can gain inertia as it starts moving prior to coming into contact with the pawl 58. The pawl 58 is not actuated until inertia has bene built up. Additionally, the gap 85 allows the geartrain 88 to generate an impulse force on the pawl 58 to overcome static friction that may be present among parts and components that are presently in contact, such as the pawl 58 and ratchet 42. Without the increased inertia and impulse force, a higher amount of force and/or torque may be necessary to move the pawl out of its ratchet holding position shown in FIG. 2.

As shown diagrammatically in FIG. 2, closure latch assembly 18 is adapted to provide the power release function in association with a passive key-less entry system. When a person approaches vehicle 10 with an electronic key fob 30 and actuates outside handle 22, for example by sensing both the proximity of key fob 30 for authentication and actuation of outside handle 22 (i.e. via electronic communication between an electronic door switch 31 and a latch electronic controller unit (ECU) 34. Note that inside handle 24 can also be actuatable via an electronic handle switch 32. In turn, latch ECU 34 actuates power release actuator 48 to cause electric motor 86 to drive dual-stage geartrain 88 for causing latch release mechanism 46 to release latch mechanism 44. Power release actuator 48 can alternatively be actuated as part of a proximity sensor type entry system (i.e. radar-based proximity detection) when a person approaches vehicle 10 with key fob 30 and actuates a proximity sensor 36, such as a capacitive sensor, or other touch/touchless sensors (based on recognition of the proximity of an object such as the touch/swipe/hover/gesture of a hand or finger).

Figure 5:
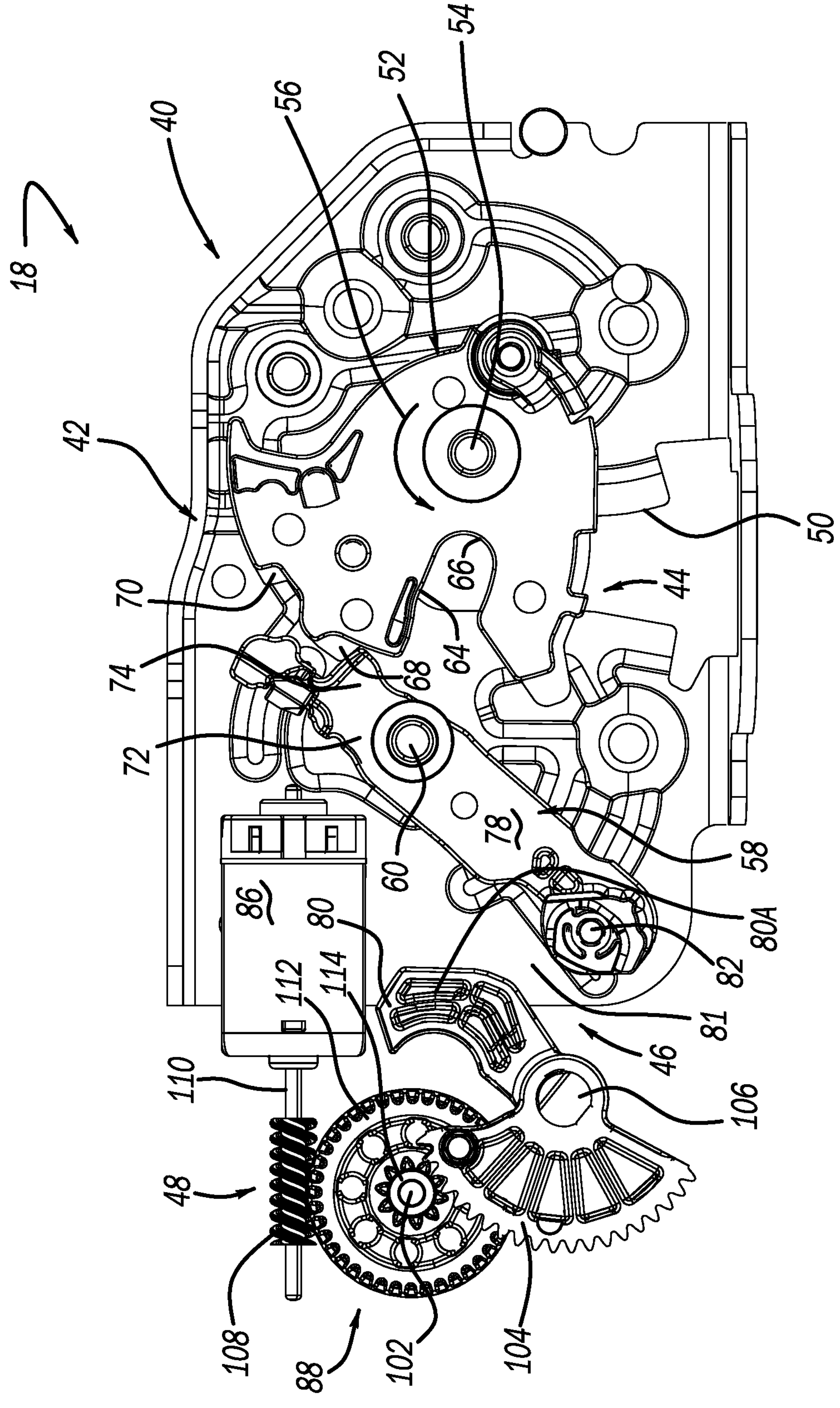
FIG. 5 is similar to FIG. 2 and illustrates the closure latch assembly in a “LATCH” mode with the latch mechanism operating in a latched state, the latch release mechanism operating in a non-actuated state, and the power release actuator operating in a non-actuated state.

Referring now to FIGS. 5 through 11, a series of sequential views of closure latch assembly 18 are provided for illustrating movement of the various components associated with latch mechanism 44, latch release mechanism 46, and power release actuator 48 resulting from a power release function operable for shifting closure latch assembly 18 from a "LATCH" mode into an "UNLATCH" mode when it is desired to permit door 16 to move from its fully-closed position into its open position. In this regard, FIG. 5 illustrates closure latch assembly 18 operating in its LATCH mode which is established when latch mechanism 44 is operating in its latched state, latch release mechanism 46 is operating in a first or "non-actuated" state, and power release actuator 48 is operating in a first or a "non-actuated" state. FIG. 5 illustrates a state similar to that shown in FIG. 2 discussed above. As previously noted, latch mechanism 44 is defined to be operating in its latched state when pawl 58 is located in its ratchet holding position with its pawl latch shoulder 74 engaged with primary latch notch 68 on ratchet 52 so as to mechanically hold ratchet 52 in its primary striker capture position. The non-actuated state for latch release mechanism 46 is established when power release cam 80 is located in a rest position (FIG. 5) disengaged from pawl release lug 82 extending from first leg segment 78 of pawl 58. To locate power release cam 80 in its rest position, power release actuator 48 establishes its non-actuated state by locating power release gear 104 in its home position (FIG. 5). As discussed above, in the rest position of power release cam 80, gap 85 is defined between power release cam 80 and pawl release lug 82 of pawl 58.

Figure 6:
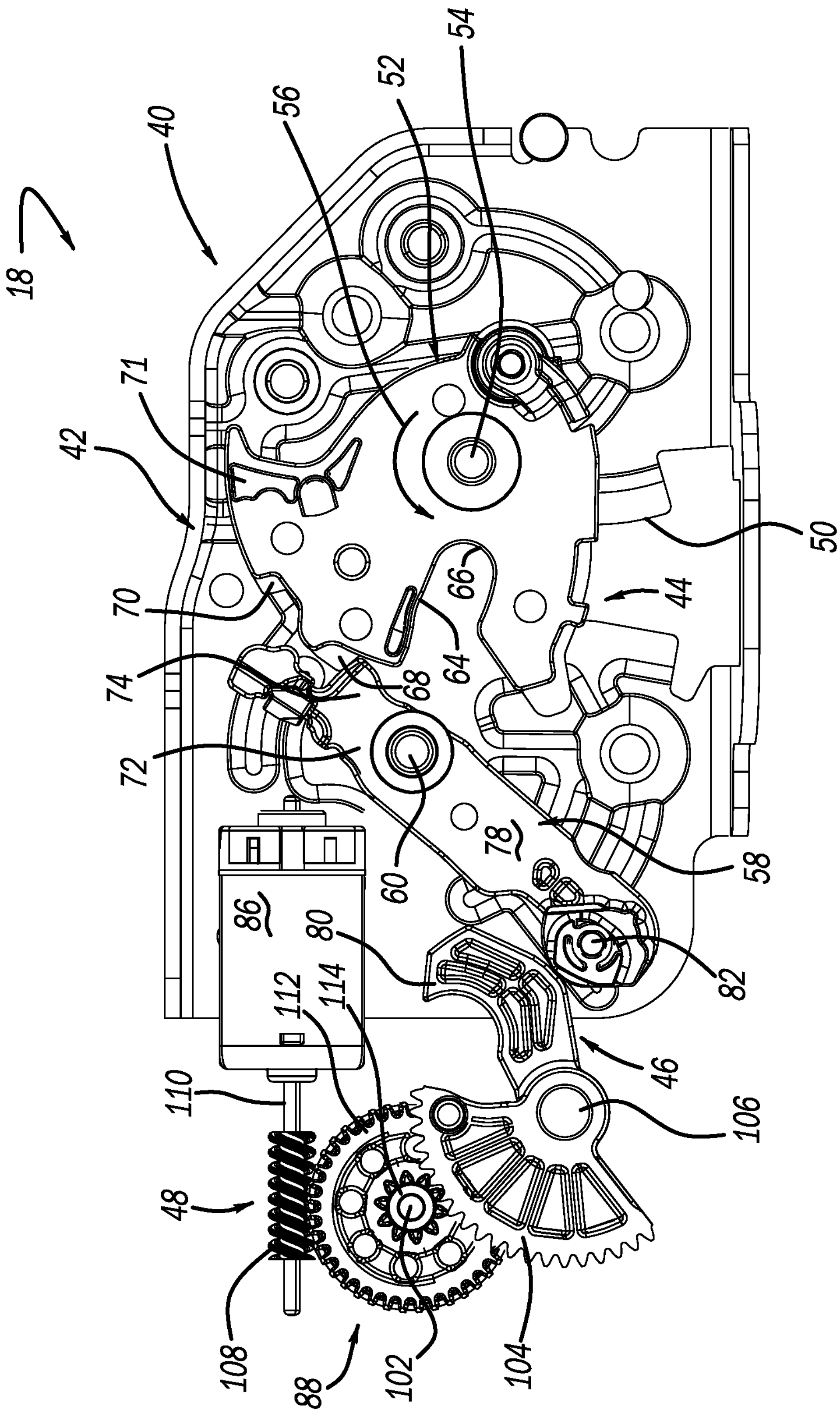
FIGS. 6 through 11 are a series of sequential views illustrating movement of various components shown in FIG. 5 for shifting the closure latch assembly into an “UNLATCH” mode with the latch mechanism operating in an unlatched state, the latch release mechanism operating in an actuated state, and the power release actuator operating in an actuated state.

In comparison to FIG. 5, FIG. 6 illustrates initial movement of some components of closure latch assembly 18 in response to initiation of the power release operation. In particular, when the power release of closure latch assembly 18 is requested and properly authenticated, latch ECU 34 powers electric motor 86 to cause motor shaft 110 to drive dual-stage geartrain 88 for rotating power release gear 104 in the releasing (i.e. clockwise) direction from its home position through a first range of rotary motion (i.e. about 10°) toward its pawl released position. This first range of rotary travel of power release gear 104 causes concurrent pivotal movement of power release cam 80 from its rest position to a release lug engagement position whereat a drive surface 80A on release cam 80 moves into engagement with a cam surface 82A on pawl release lug 82. The progression of component movement from FIG. 5 to FIG. 6 illustrates a predetermined amount of "pre-travel" provided between power release actuator 48 and latch release mechanism 46. The amount of pre-travel is dependent on the size of the gap 85 described previously above. In one aspect, the gap 85 may be about 2 mm allowing about 2 mm of pre-travel of the power release cam 80.

Note that latch release mechanism 46 is still shown operating in its non-actuated state while latch mechanism 44 is likewise still shown operating in its latched state. However, it will be appreciated that the non-actuated state of FIG. 6 is different than the non-actuated state of FIG. 5, in that the pawl release cam 80 has moved into its initial contact with the pawl release lug 82 of pawl 58. Further rotation of pawl release gear 104 will cause initial movement of the pawl 58. Accordingly, in FIG. 6, gap 85 has been eliminated.

Figure 7:
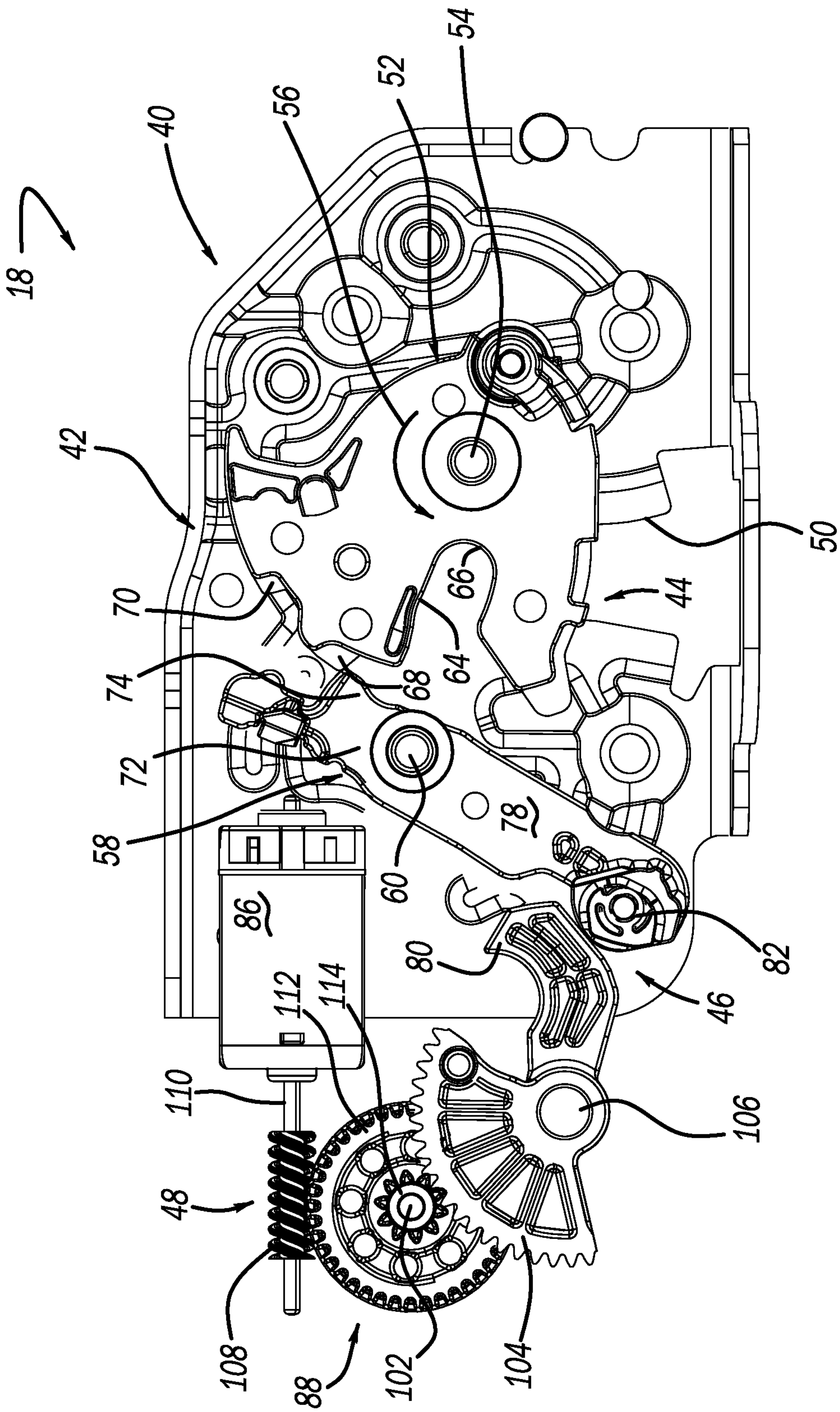

In comparison to FIGS. 5 and 6, FIG. 7 now illustrates the continued movement of the components of closure latch assembly 18 during the power release operation. In particular, electric motor 86, via dual-stage geartrain 88, continues to drive power release gear 104 in the releasing direction through a second range of rotary motion (i.e. about 18°) toward its pawl released position. This second range of rotary travel of power release gear 104 causes concurrent pivotal movement of power release cam 80 from its initial release lug engagement position (FIG. 6) toward its full-travel position (FIG. 11) which, in turn, causes the engagement of drive surface 80A with cam surface 82A to initiate movement of pawl 58 from its ratchet holding position (FIGS. 5 and 6) toward its ratchet releasing position (FIGS. 8 and 9), in opposition to the biasing of pawl spring 62. FIG. 7 illustrates pawl 58 moved to a position, relative to FIG. 6, whereat its latch shoulder 74 is still maintained in engagement with primary latch notch 68 on ratchet 52 (in a tip to tip condition), whereby ratchet 52 is still held by pawl 58 in its primary striker capture position. Rotation beyond this tip to tip configuration will allow ratchet 52 to begin pivoting open.

In comparison to FIGS. 5-7, FIG. 8 now illustrates that continued movement of the components of closure latch assembly 18 during the power release operation causes it to shift from its LATCH mode into its UNLATCH mode, having moved beyond the tip to tip configuration of FIG. 7. In particular, electric motor 86, via dual-stage geartrain 88, continues to drive power release gear 104 through a third range of rotary motion (i.e. about 10°) into its pawl released position. This third range of rotary travel of power release gear 104 causes power release cam 80 to continue to move toward its full-travel position such that engagement of drive surface of power release cam 80 with cam surface of pawl release lug 82 has now resulted in movement of pawl 58 into its ratchet releasing position. As such, latch shoulder 74 on pawl 58 is released from engagement with primary latch shoulder 68, thereby placing latch mechanism 44 in its unlatched state and latch release mechanism 46 in its actuated state. Ratchet 52 is shown still located in its primary striker capture position just prior to ratchet-biasing spring 56 (and any compressive loads exerted by weather seal 28) driving ratchet 52 about ratchet pivot post 54 toward its striker release position. it will be appreciated that the state illustrated in FIG. 8, like the various other states shown in prior figures and figures to follow, represents the components of latch assembly 18 in an instantaneous state, with a variety of intermediate states therebetween corresponding to the movement of the various components.

Figure 8:
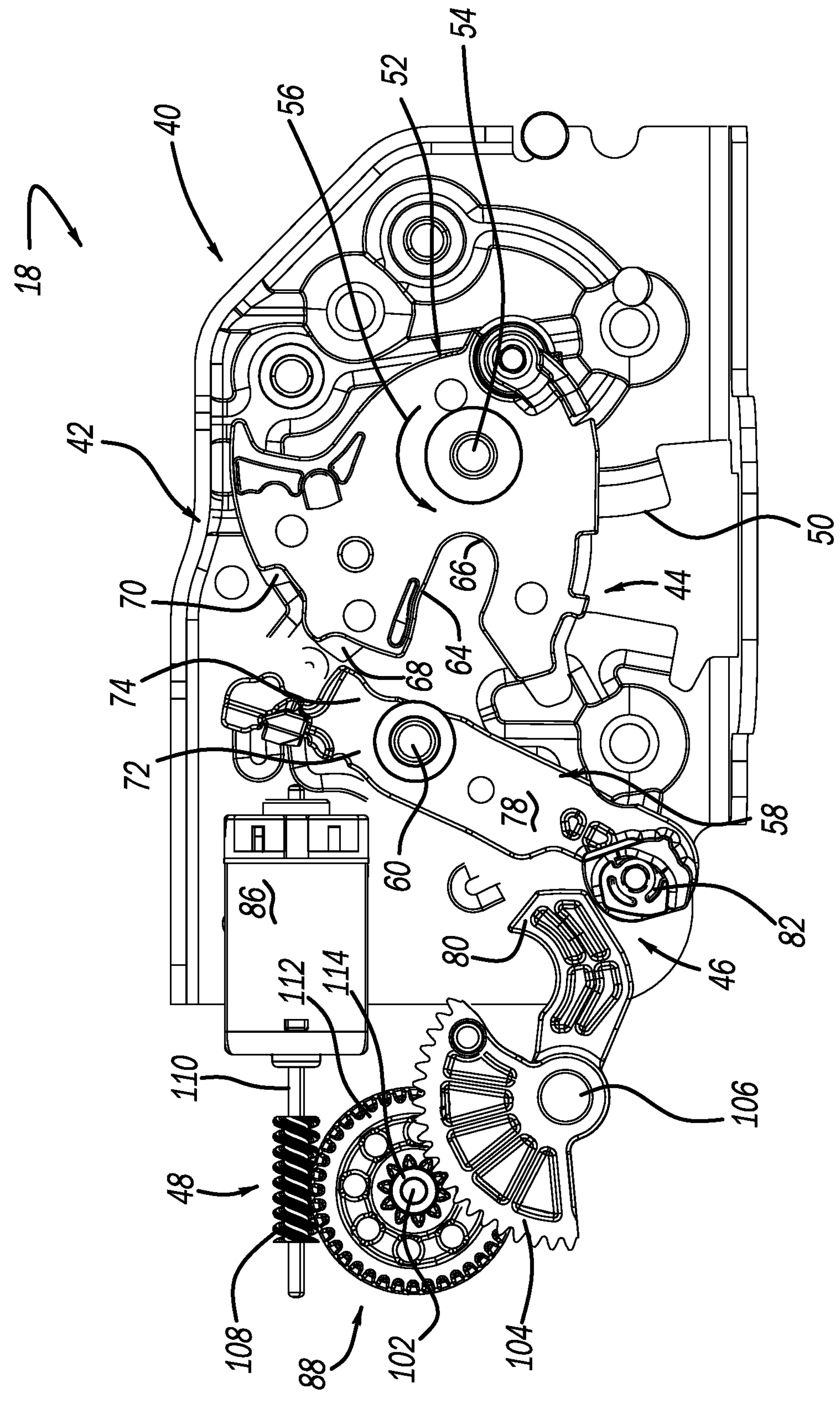
Figure 9:
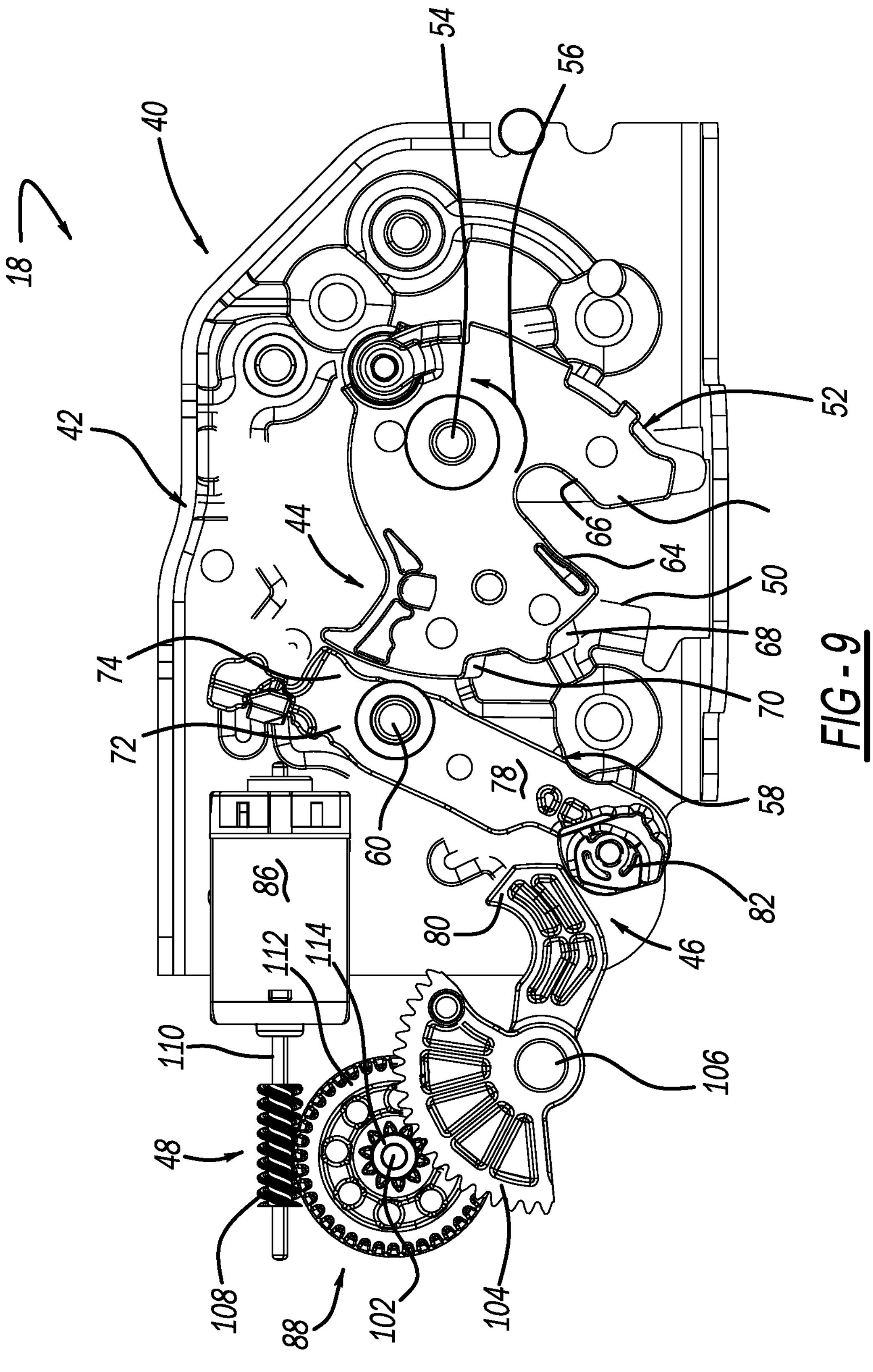

In that regard, and in contrast to FIG. 8, FIG. 9 now illustrates such movement of ratchet 52 into its striker release position while pawl 58 is held in it ratchet releasing position. Movement of ratchet 52 is shown relative to the position of FIG. 8 and caused by the biasing of ratchet 52 toward its open position. The other components of latch assembly 18 are shown in the same position in FIG. 8 relative to FIG. 9.

Figure 10:
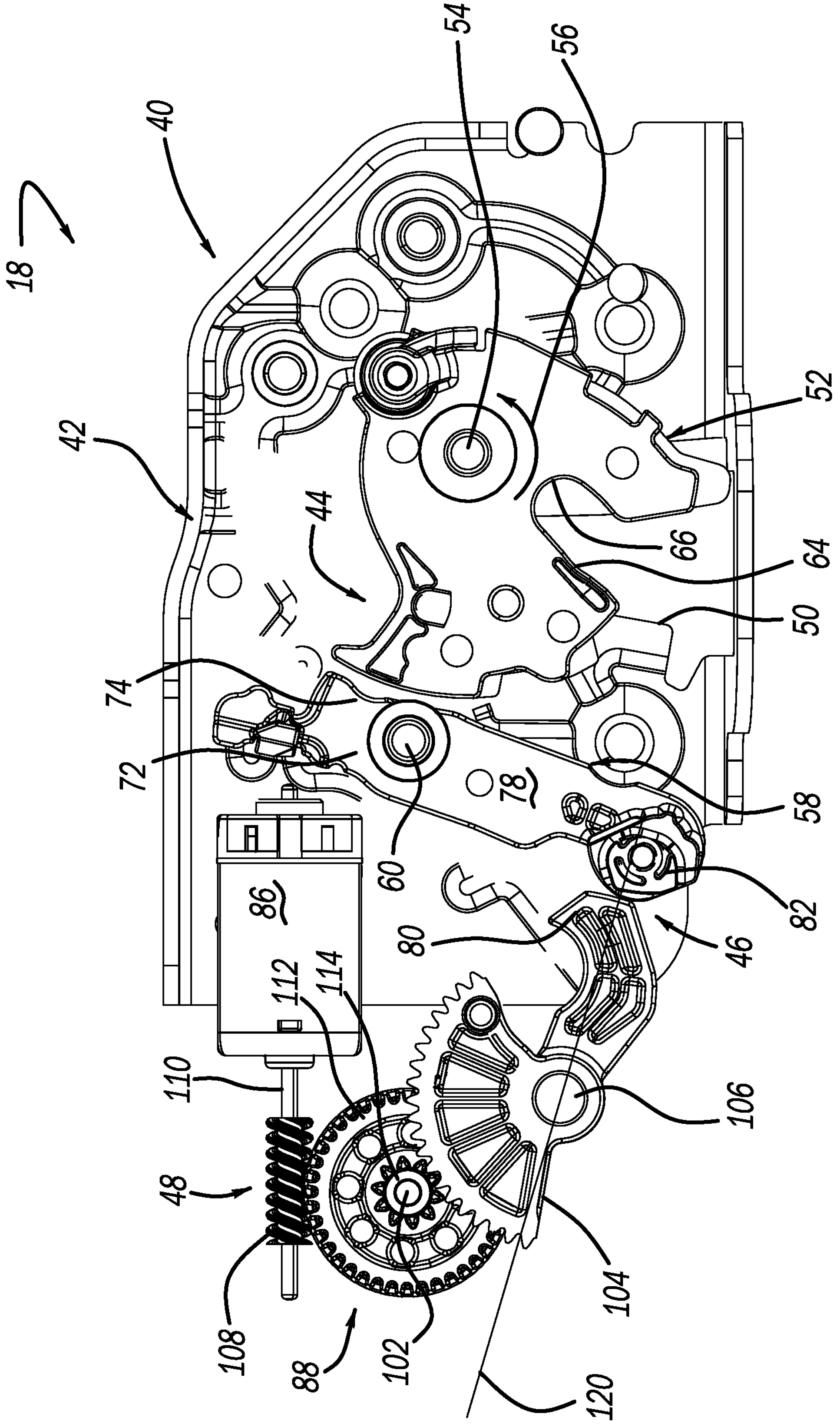

In comparison to FIGS. 8 and 9, FIG. 10 now illustrates continued movement of the various components of closure latch assembly 18 during continuation of the power release operation following closure latch assembly 18 being shifted into its UNLATCH mode. In particular, electric motor 86, via dual-stage geartrain 88, continues to drive power release gear 104 in the releasing direction through a fourth range of rotary motion (i.e. about 17°) from its pawl released position (FIGS. 8 and 9) into a snow load position. This fourth range of rotary travel of power release gear 104 causes power release cam 80 to continue to move toward its full travel position such that continued engagement of drive surface of cam 80 with cam surface of lug 82 causes movement of pawl 58 from its ratchet releasing position into a ratchet disengaging position. Pawl 58 continues to pivot in the same direction as it did when moving away from the ratchet holding position.

As such, latch shoulder 74 is held displaced from engagement with an arcuate external guide surface 71 of ratchet 52 while ratchet 52 is located in its striker release position. This extra rotation of pawl 58 from its ratchet releasing position (FIG. 9) into its ratchet disengaging position (FIG. 10) also functions to establish a reaction force, as indicated by line 120, between cam surface of pawl release lug 82 and drive surface of power release cam 80 that passes through second gear post 106 associated with power release gear 104. As such, a stable condition is established which effectively inhibits self back-driving of pawl 58 towards its ratchet holding position due to the biasing exerted thereon by pawl spring 62. Prior to reaching this state and aligning force vector 120 with the post 106, the biasing force on pawl 58 may operate to back drive gear 104 and ultimately motor 86 if the motor stops actuating.

Figure 11:
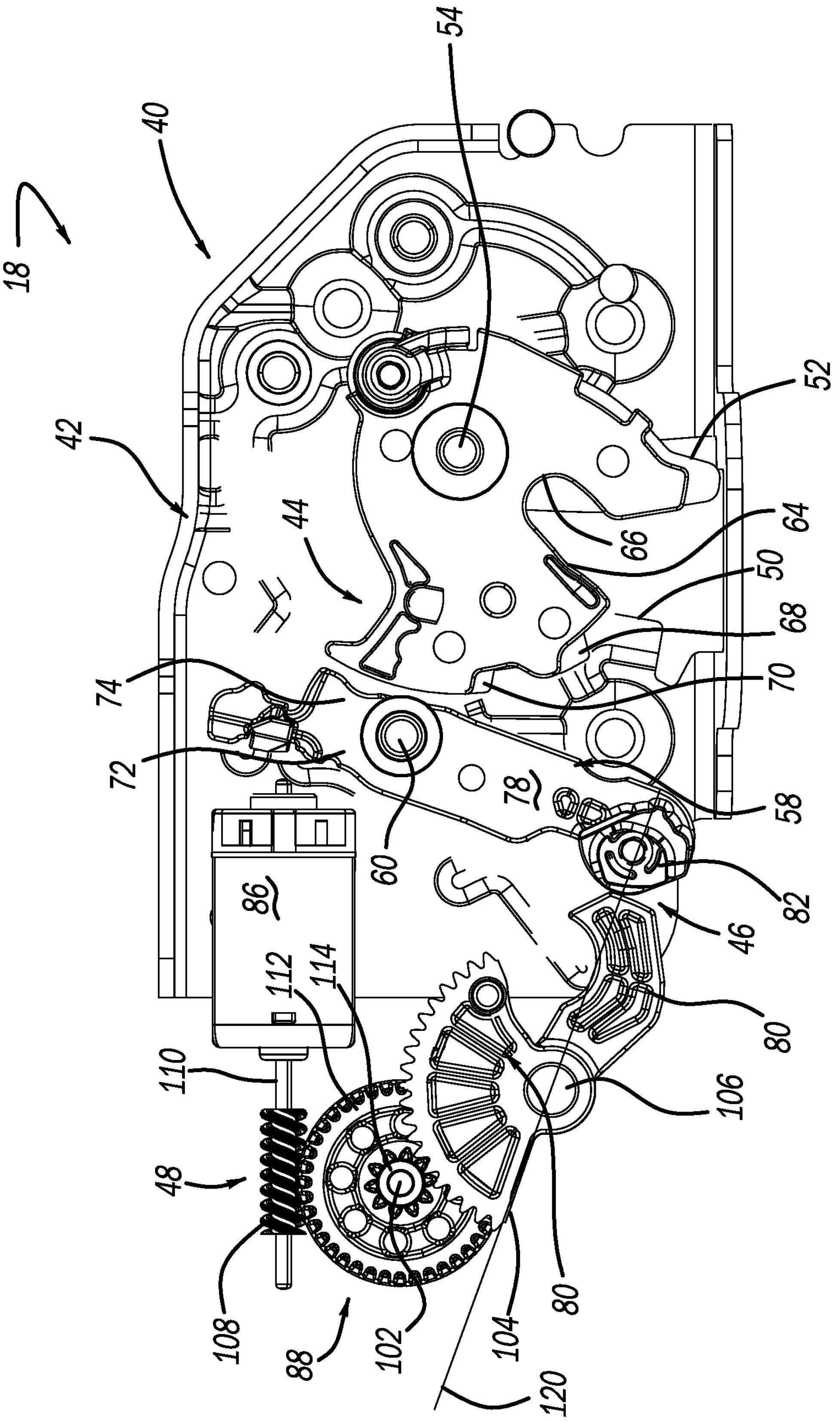
Figure 11A:
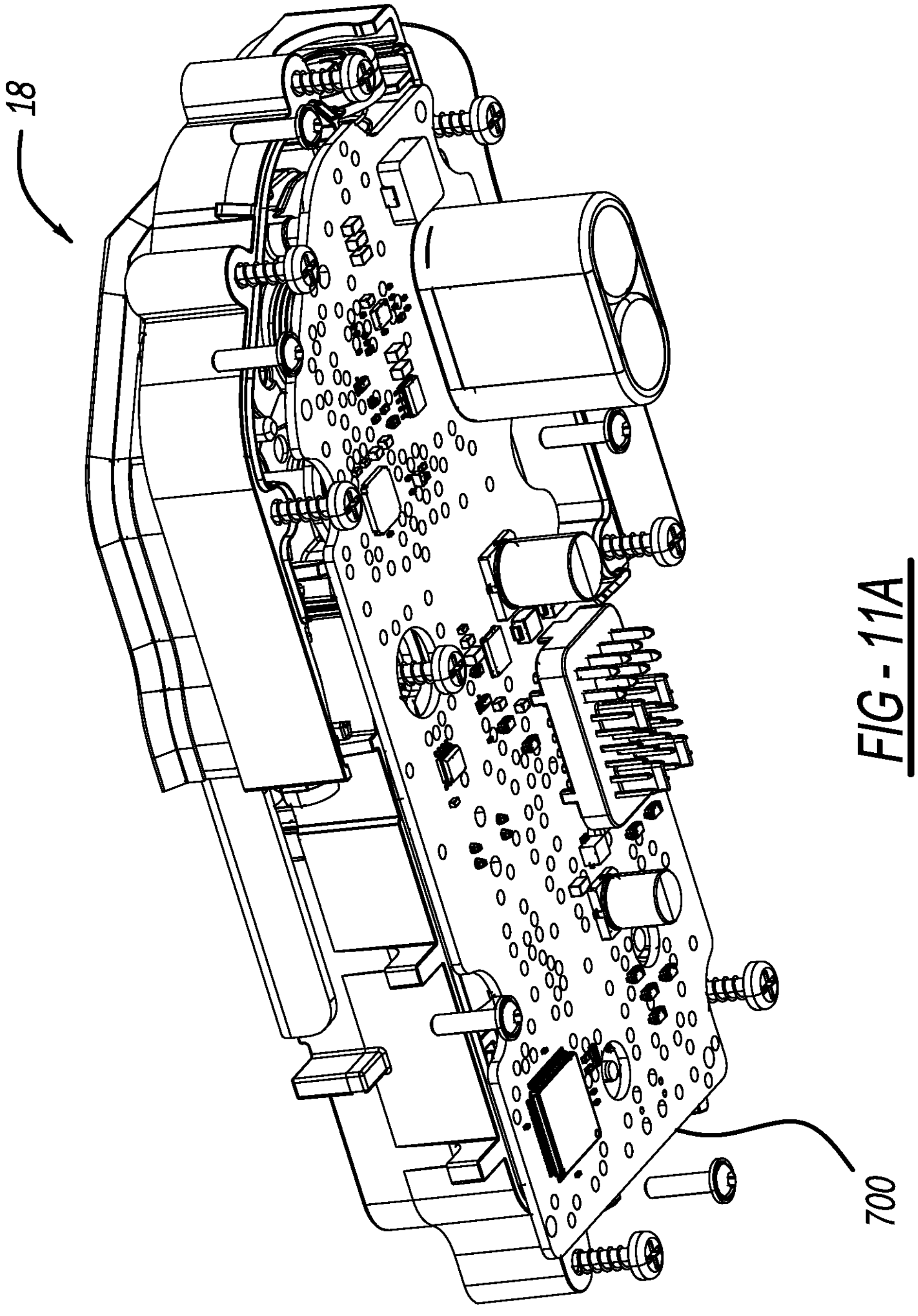
FIG. 11A is a bottom isometric view illustrating a printed circuit board of the closure latch assembly.

Finally, in comparison to FIG. 10, FIG. 11 now illustrates movement of the various components of closure latch assembly 18 upon completion of the power release operation. In particular, electric motor 86, via dual-stage geartrain 88, has continued to drive power release gear 104 in the releasing direction through a fifth range of rotary travel (i.e. about 15 degrees) from its snow load position into an end of travel position. This fifth range of rotary travel of power release gear 104 causes power release cam 80 to be moved into its full travel position. However, the interaction between drive surface of power release cam 80 and cam surface of pawl release lug 82 still functions to maintain pawl 58 in its ratchet disengaging position. Note that the total amount of angular travel of power release gear 104 through its five distinct ranges of travel has been identified to be about 70 degrees for causing power release gear 104 to move from its home position (FIG. 5) to its end of travel position (FIG. 11). This specific total amount of angular travel for power release gear 104 is merely exemplary and can be modified, along with the sub-totals and the actual number of distinct travel ranges, to meet different vehicular closure latch requirements and applications.

With further reference to FIG. 11, power release cam 80 makes contact with lug 82 via an end surface of the cam 80, relative to the curved surface described previously. In this arrangement, force vector 120 from lug 82 continues to extend through post 106. In one aspect, in the transition from FIG. 10 to FIG. 11, force vector 120 remains aligned with post 106. In one aspect, force vector 120 is normal to the outer curvature of lug 82.

The latch assembly 18 illustrated herein provides various advantages in the opening of the ratchet 52. Pawl 58 includes first leg segment 78 and second leg segment 72. First leg segment 78 is longer than second leg segment 72. First leg segment 78 is also longer than the lever arm defined by cam 80 that extends radially from the sector gear 104. The long arm defined by first leg segment 78 extends between the pivot point of pawl 58 and the cam surface of lug 82. This arm is substantially longer than the short arm defined between the pivot point of pawl 58 and the contact point with the ratchet 52 when the pawl 58 is in the ratchet holding position.

The pawl 58 provides the greatest resistance to opening when the pawl 58 is engaged with the ratchet 52 in the ratchet holding position. Initial contact by the cam 80 occurs as a relatively short radius along the cam 80. As the cam 80 continues to rotate, the lever arm of the cam 80 increases while acting on the long arm of the first leg segment 78 of the pawl 58. As the contact point on the cam 80 moves outward during release, the lever arm increases, and continues to act on the generally long arm of the first leg segment 78.

Thus, the initial contact of the cam 80 is closer to the pivot point of the sector gear 104, where more torque is initially needed to overcome static forces and seal loads. The contact point moves radially outward during release as less torque is needed and static loads have been initially overcome. Upon additional movement, less force is necessary, as the spring bias is the primary force to overcome because seal loads have been overcome.

Power release actuator 48 can be reset from its actuated state back into its non-actuated state upon internal latch sensors detecting at least one of power release gear 104 being located in its end of travel position, power release cam 80 being located in its full travel position and pawl 58 being located in its ratchet disengaging position. Resetting power release actuator 48 allows ratchet 52 to later become latched and held in its latched positon. Prior to reset, a closing force on the ratchet would be overcome by the ratchet bias due to the pawl 58 being held in its ratchet releasing of fully actuated position (out of engagement with the ratchet).

Figure 11B:
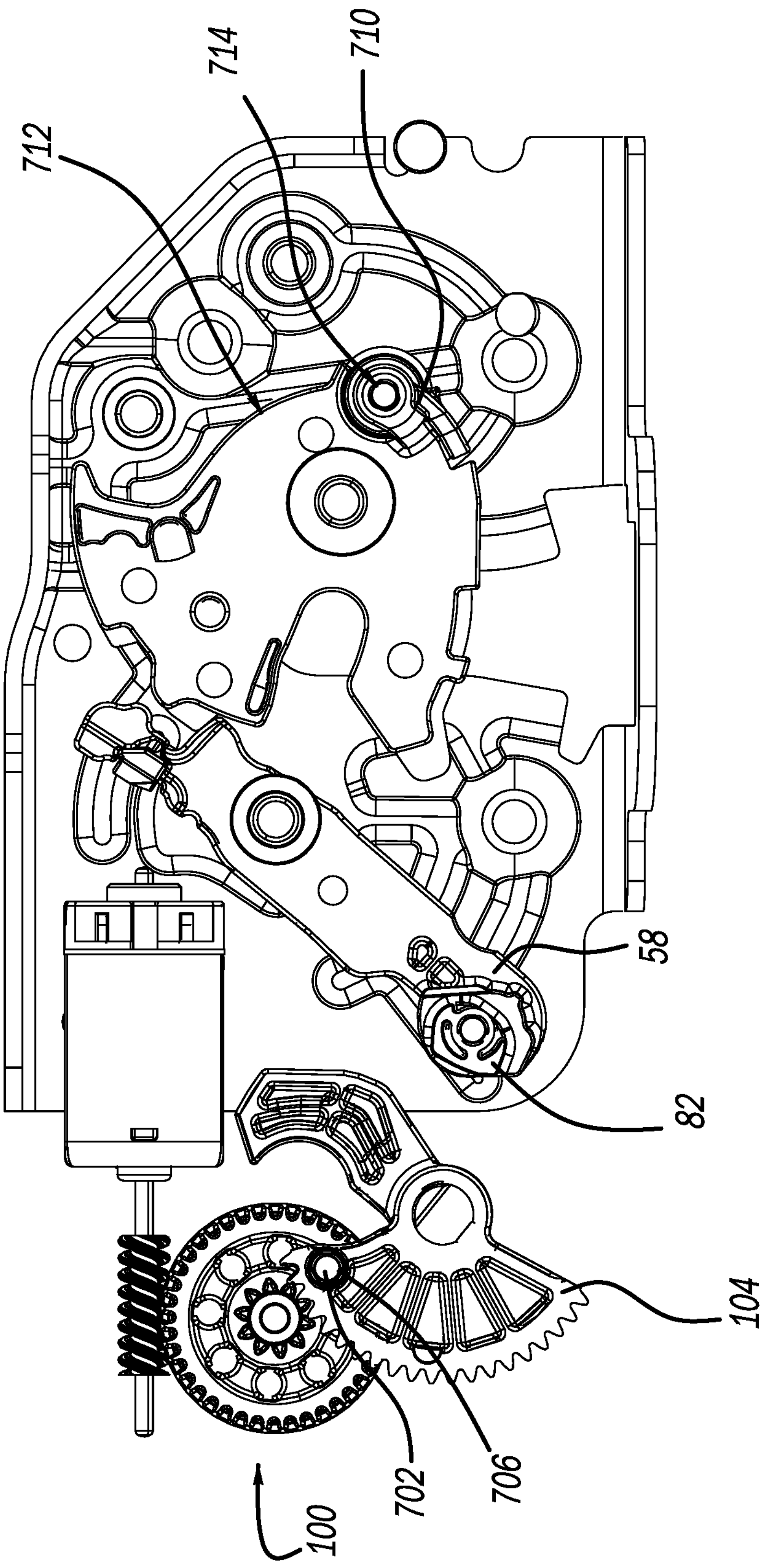
FIG. 11B is a plan view of the closure latch assembly illustrating hall sensors and magnets with the geartrain in a rest position.
Figure 11C:
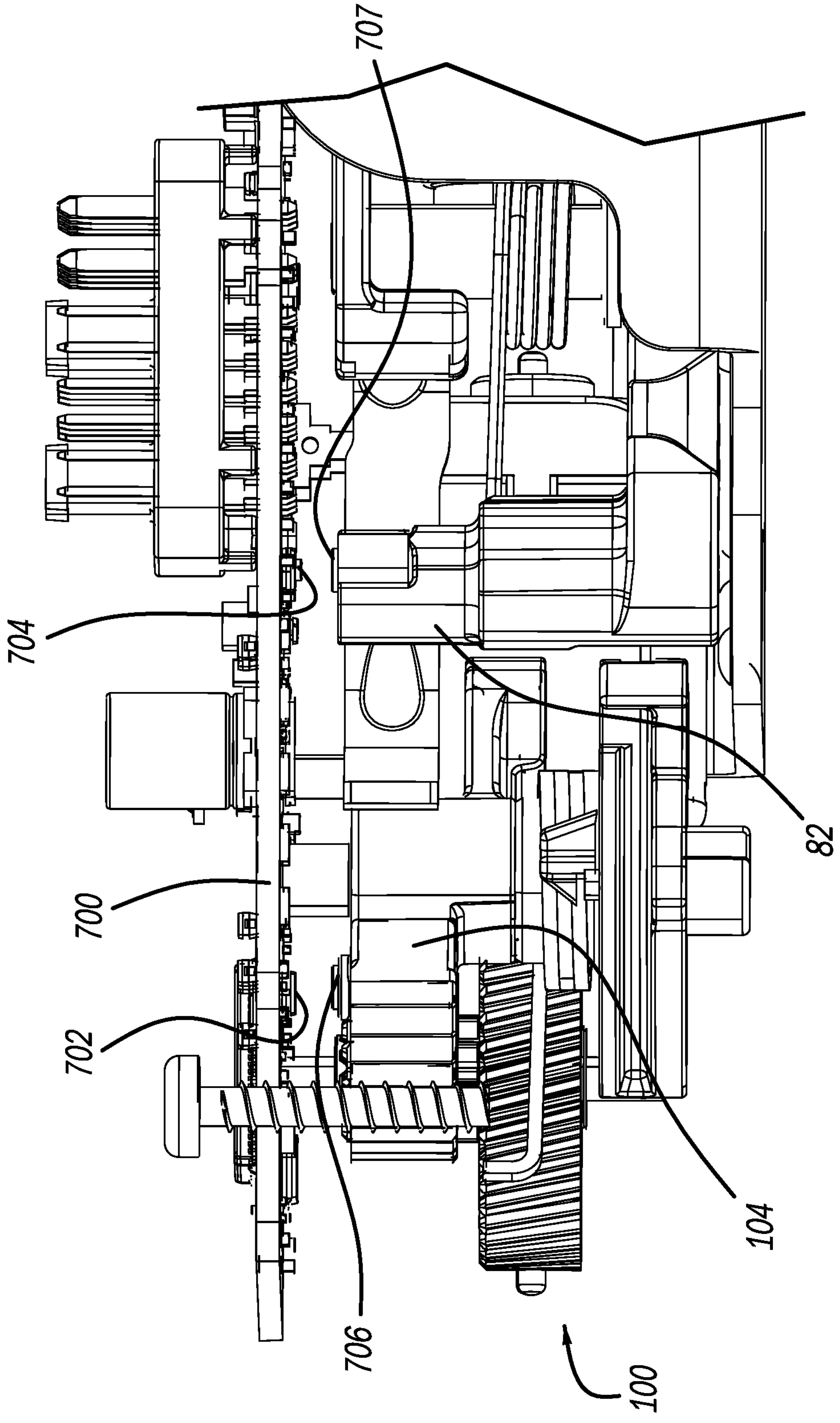
FIG. 11C is cross-sectional front view illustrating the hall sensors relative to the magnets.

With reference to FIGS. 11A-11E, PCB 700 is shown attached to closure latch assembly 18. FIG. 11B illustrates latch assembly 18 with PCB 700 hidden, but illustrating the locations of various sensors. FIG. 11C illustrates a cross-sectional view illustrating sensors mounted to PCB 700 in relation to magnets mounted to the moveable components. PCB 700 includes first hall sensor 702 attached or otherwise mounted to PCB 700. The hall sensor 702 is positioned to detect a position of the sector gear 104. A second hall sensor 704 is positioned on the PCB 700 to detect a position of the pawl 58.

In one aspect, first hall magnet 706 may be disposed at one end of the sector gear 104. In one aspect, first hall magnet 706 may be disposed on the sector gear 104 such that the magnet 706 is adjacent hall sensor 702 (above, shown in FIG. 11C) when the sector gear 104 is in the rest position or home position shown in FIG. 11B. Accordingly, due to the gap 85, hall sensor 702 may detect that sector gear 104 has moved out of its rest position and toward its first contact with the pawl 58, when magnet 706 rotates away from hall sensor 702 as sector gear 104 moves.

Similarly, second hall magnet 708 may be disposed on an end of pawl 58, and is aligned with hall sensor 704 when pawl 58 is in its rest position, shown in FIGS. 11B and 11C.

Additional third and fourth hall sensors 710 and 712 and third hall magnet 714 may be provided for the ratchet 52 to detect the positon of the ratchet 52. For example, hall sensors 710 and 712 (FIG. 11B) may be placed in two positions for detecting the position of the ratchet 52. A single hall magnet 714 may be placed on the ratchet 52, and may be detected by one of the two hall sensors 710, 712 to indicate the ratchet 52 being in the open position or the closed position.

Figure 11D:
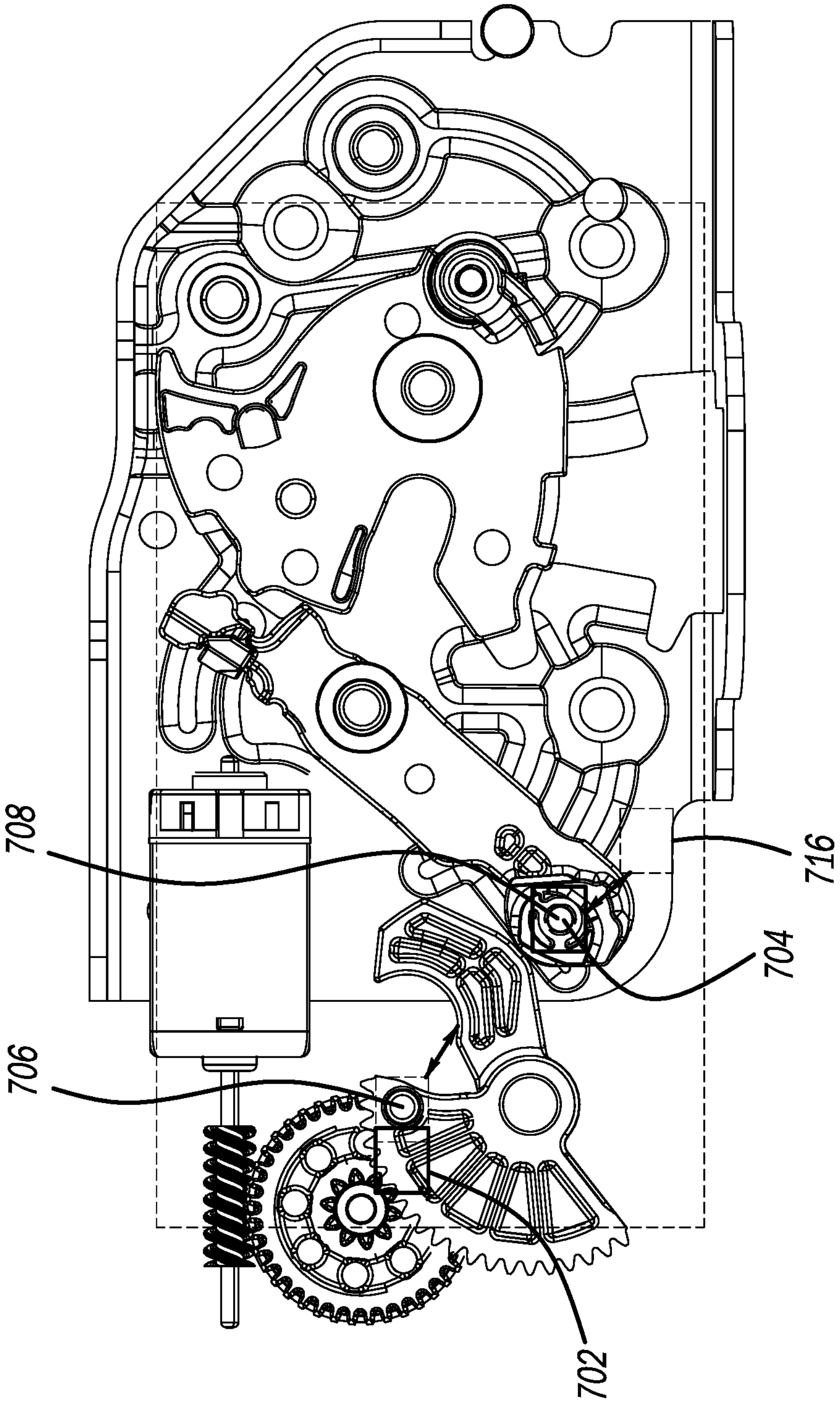
FIG. 11D is a plan view of the closure latch assembly showing the sector gear and arm rotated such that the arm makes initial contact with the pawl, and the relative locations of the magnets relative to the hall sensors.
Figure 11E:
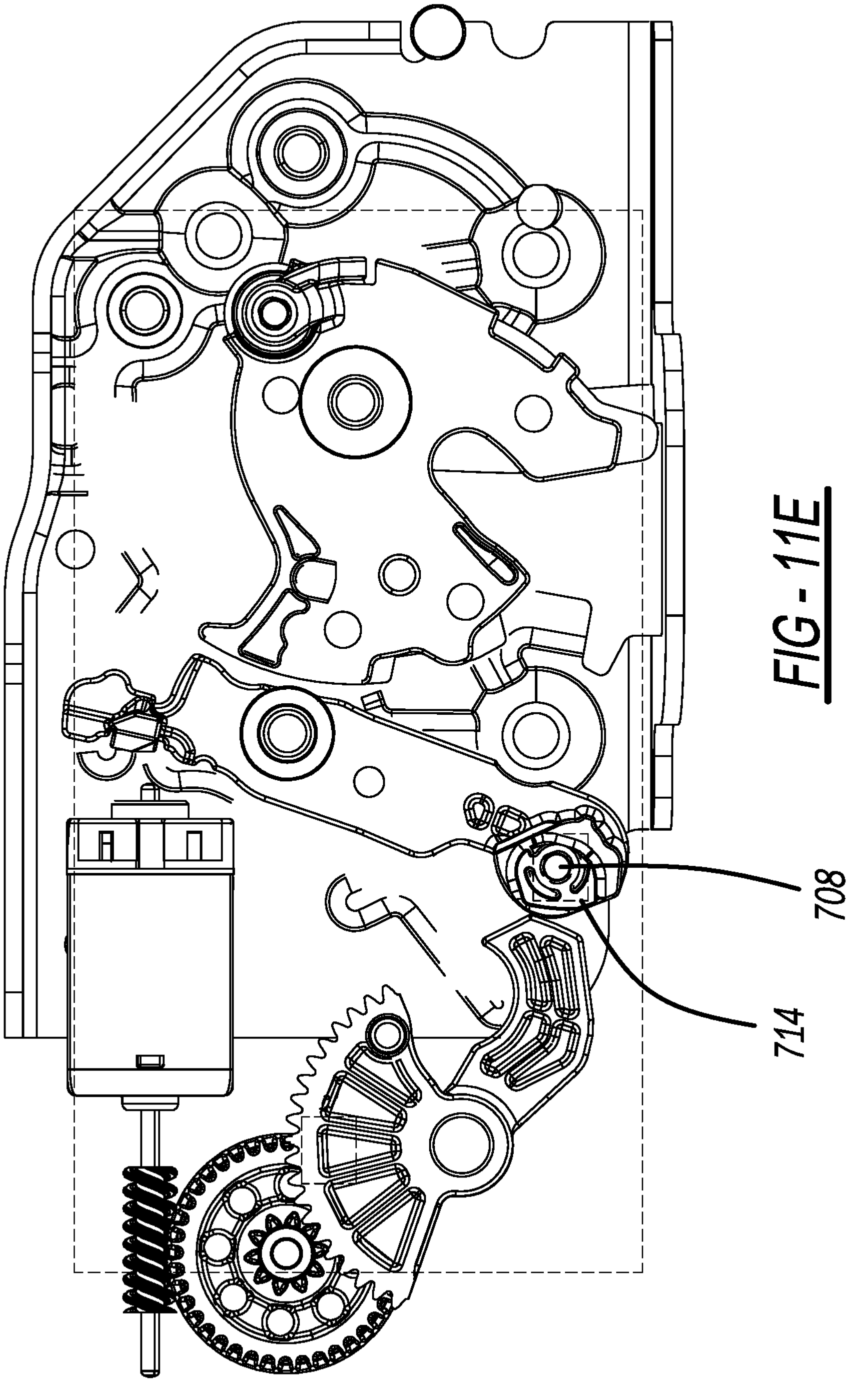
FIG. 11E is a plan view of the closure latch assembly in an end of travel position and illustrating the magnets relative to the hall sensors.

A fourth hall sensor 716 may be disposed in a position corresponding to the position of the hall magnet 708 of the pawl 58 when the pawl 58 is in the ratchet releasing position. FIGS. 11D and 11E illustrate sector gear 104 and pawl 58 in both the first contact position after actuation with gap 85 eliminated, as well as the snow load position (end of travel), showing the different positions of magnets 706 (on the sector gear 104) and 708 (on the pawl 58). As shown in FIG. 11D, magnet 706 is aligned with sensor 702, and magnet 708 is aligned with sensor 704. Sensor 716 has no aligned magnet. FIG. 11E shows magnet 708 aligned with sensor 714, indicating that the pawl 58 has moved. FIG. 11D shows magnet 706 moved away from sensor 702 to indicate that sector gear has moved from the rest position. Magnet 708 remains aligned with sensor 704, indicating that the pawl 58 has not yet moved.

Referring back to FIGS. 5-11 (in reverse order), upon positional detection of the end of travel position of sector gear 104 (FIG. 11E), latch ECU 34 powers electric motor 86 to cause motor shaft 110 to drive dual-stage geartrain 88 for rotating power release gear 104 in a second or "resetting" direction (i.e. counterclockwise) from its end of travel position toward its home position. This will concomitantly result in movement of power release cam 80 from its full travel position toward its rest position which, in turn, will permit pawl spring 62 to forcibly drive pawl 58 from its ratchet disengaging position back to its ratchet releasing position (FIG. 9) whereat its latch shoulder 74 engages ratchet guide surface 71. Continued rotation of gear 104 counterclockwise will disengage cam 80 from pawl 58, allowing pawl 58 to biased against surface 71. Rotation of ratchet 52 toward its closed position is permitted as pawl 58 does not yet block ratchet 52. Continuing rotation of ratchet 52 will create the tip to tip configuration discussed above, and thereafter pawl 58 will rotate into is ratchet holding position.

Figure 12:
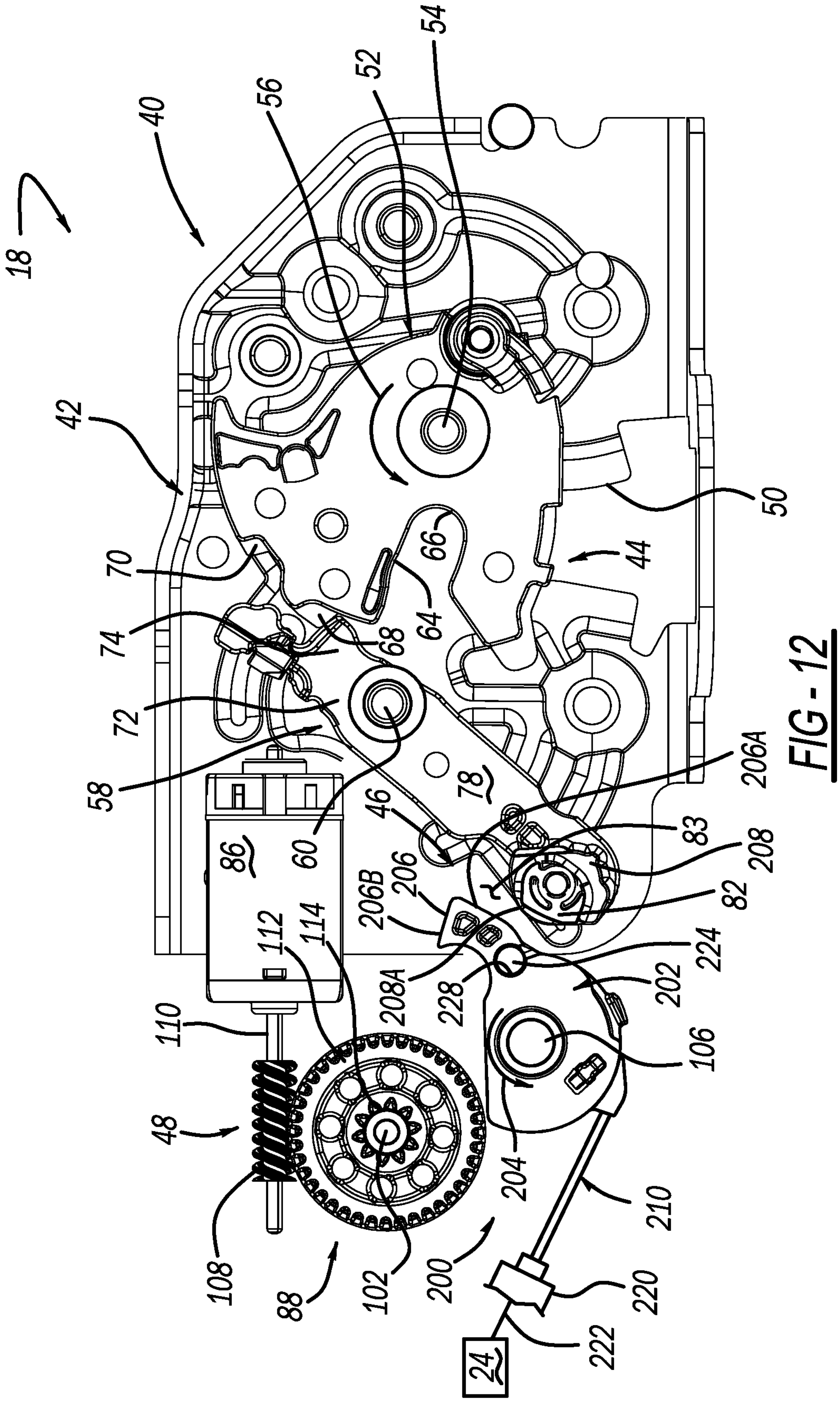
FIGS. 12 through 14 are a series of sequential views illustrating the shifting of the closure latch assembly from its LATCH mode into its UNLATCH mode in response to manual operation of the inside (IS) latch release mechanism.
Figure 13:
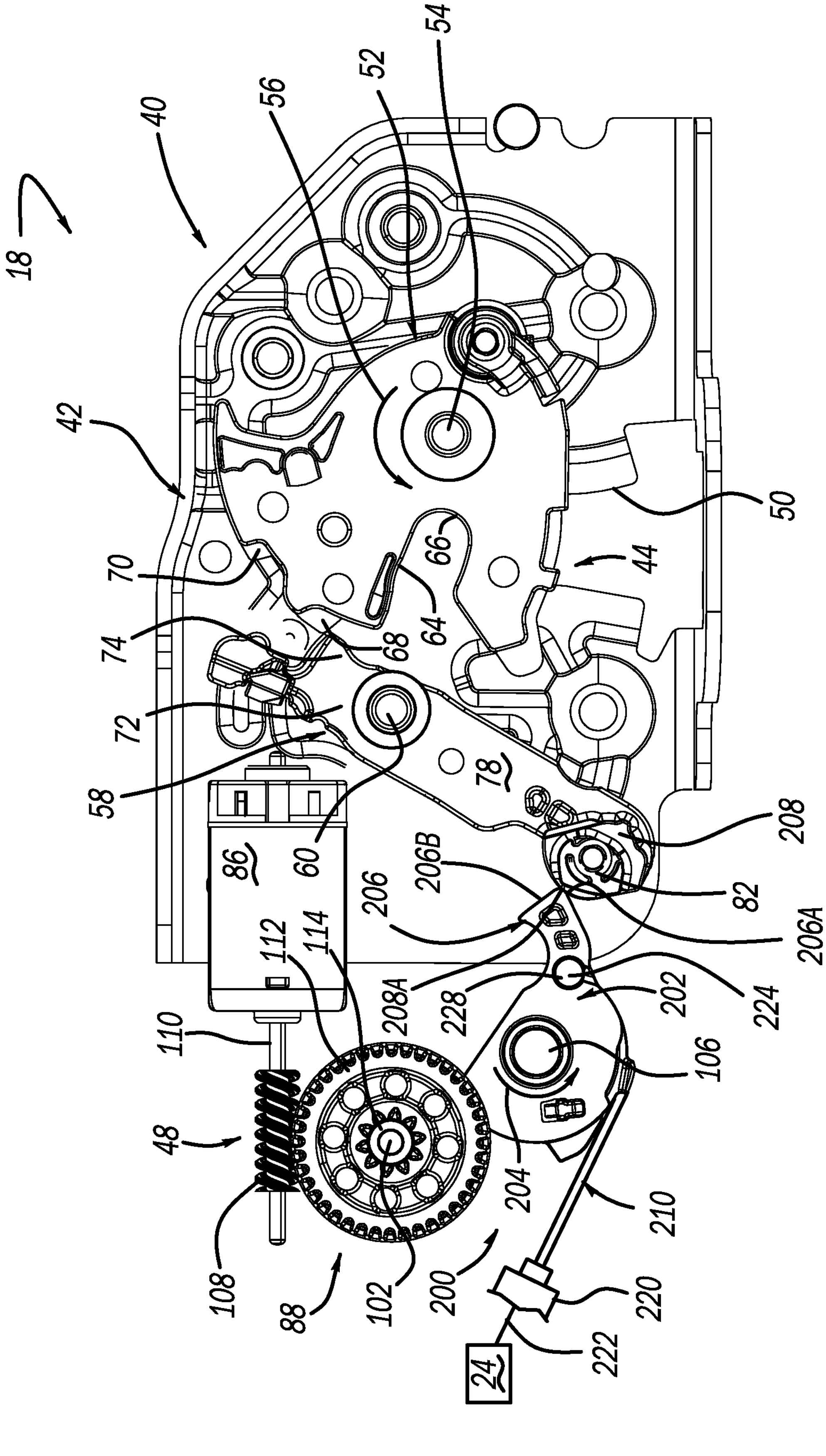
Figure 14:
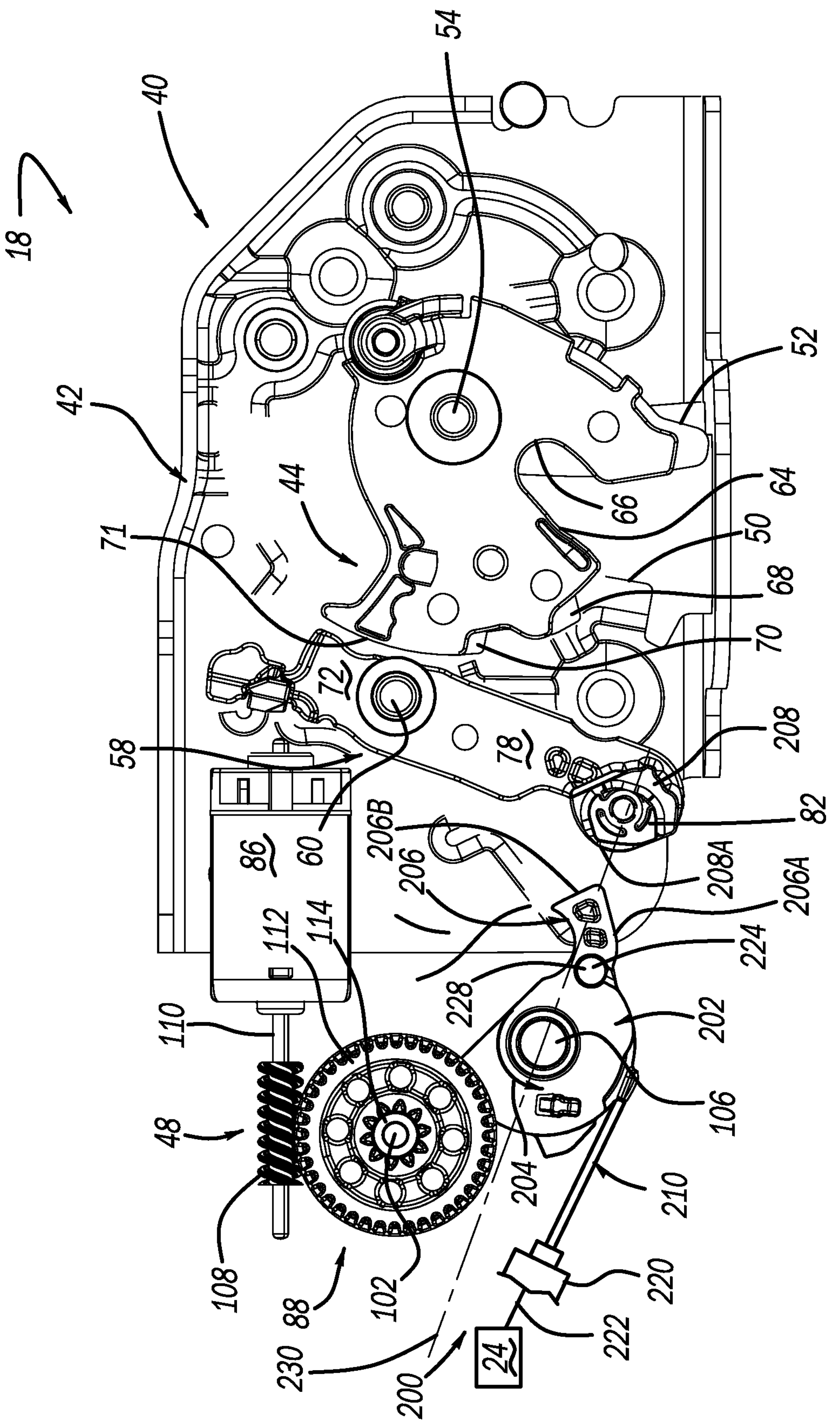

Referring now to FIGS. 12 through 14, a sequence of similar views are provided for illustrating manual operation of an inside (IS) latch release mechanism 200 for shifting latch mechanism 44 from its latched state (FIG. 12) into its unlatched state (FIG. 14) via actuation of insider door handle 24. Similar movement of pawl 58 and ratchet 52 may occur in such an IS manual release operation, except that components are actuated manually rather than by the ECU.

In addition, particular attention to FIG. 3, in combination with FIGS. 12-14, provides a better understanding of the orientation and configuration of IS latch release mechanism 200 in relationship to power release actuator 48 and latch release mechanism 46. FIG. 3 also provides further illustrative detail regarding components describe above, such as cam 80 and lug 82.

IS latch release mechanism 200 is shown, in this non-limiting embodiment, to generally include a backup release lever 202 supported for rotary movement relative to latch plate 42 (and housing 90) via second gear post 106, a backup release lever spring 204, a manual release cam 206, a pawl release boss 208, and a cable actuation assembly 210. Backup release lever 202 is moveable about second gear post 106 between a first or "home" position (FIG. 12) and a second or "end of travel" position (FIG. 14). Backup release lever spring 204 is operable to normally bias backup release lever 202 toward its home position (away from pawl 58). As will be detailed, IS latch release mechanism 200 is operable in a non-actuated state (FIG. 12) when backup release lever 202 is located in its rest position and is operable in an actuated state (FIG. 14) when backup release lever 202 is located in its end of travel position. Furthermore, shifting of IS latch release mechanism 200 from its non-actuated state into its actuated state causes latch mechanism 44 to be shifted from its latched state into its unlatched state, thereby also causing closure latch assembly 18 to be shifted from its LATCH mode into it UNLATCH mode.

Manual release cam 206 is shown to be fixed to, or integrally formed on, backup release lever 202 and defines a contoured drive surface 206A. Likewise, pawl release boss 208 is shown fixed to, or integrally formed on, first leg segment 78 of pawl 58 and defines a pawl cam surface 208A. FIG. 3 best illustrates pawl release boss 208 being formed coaxially with pawl release lug 82 on the end of first leg segment 78 of pawl 58. In addition, backup release lever 202 and manual release cam 206 are shown in FIG. 3 to be coaxially aligned, but independently moveable, with respect to power release gear 104 and power release cam 80. Thus, manual release lever 202 may be actuated without causing a force to be applied on geartrain 88

As such, a "stacked" compact arrangement is provided for the components associated with facilitating both the power release and the manual release of latch mechanism 44. Since manual release cam 206 is moveable in concert with backup release lever 202, rotation of backup release lever 202 about pivot post 106 between its home position and its end of travel position results in corresponding movement of manual release cam 206 between a first or "rest" position (FIG. 12) and a second or "full travel" position (FIG. 14). In one aspect, cam 80 and lug 82 are located in a common plane, while cam 206 and boss 208 are located in a common plane. In one aspect, these common planes are parallel to each other.

Cable actuation assembly 210 is shown to include a tubular guide sheath 220 and a cable 222 disposed with guide sheath 220. A first end of cable 222 has a ferrule 224 that is retained within a retention aperture 228 formed in backup release lever 202. FIG. 3 illustrates that a portion of the first end of cable 222 adjacent to ferrule 224 is retained in an arcuate peripheral guide slot 226 formed in the edge surface of backup release lever 202. A second end of cable 222 is secured to a moveable actuation component of insider door handle 24. As such, movement of door handle 24 from a first or "released" position to a second or "pulled" position causes cable 222 to rotate backup release lever 202 about pivot post 106 from its home position to its end of travel position, thereby impacting pawl 58 and pivoting pawl 58 toward its ratchet releasing position. Gear 104, and the geartrain 88, does not rotate in response.

FIG. 12 illustrates IS latch release mechanism 200 operating in its non-actuated state with latch mechanism 44 operating in its latched state. In particular, backup release lever 202 is shown located in its home position for locating manual release cam 206 in its rest position while pawl 58 is shown located in its ratchet holding position with its latch shoulder 74 engaged with primary latch notch 68 for holding ratchet 52 in its primary striker capture position. As also shown, drive surface 206A on manual release cam 206 is displaced from engagement with pawl cam surface 208A on pawl release boss 208. Similar to the cam 80 and lug 82, a gap 83 is defined between manual release cam 206 and pawl release boss 208. While the motor 86 in the manual release does not need to gain inertia, the gap 83 still allows for generation of an impulse force to overcome static friction, which may be desirable in particular for post-crash situations with increased seal loads.

In contrast to FIG. 12, FIG. 13 illustrates that movement of door handle 24 from its released position toward its pulled position results in corresponding rotation of backup release lever 202 in a first or "releasing direction (i.e. clockwise) from its home position toward its end of travel position, thereby moving manual release cam 206 from its rest position to an intermediate or "pawl engaging" position. Such movement of manual release cam 206 to its pawl engaging position causes its drive surface 206A to engage pawl cam surface 208A on pawl release boss 208 and forcibly move pawl 58 from its ratchet holding position into a tip-to-tip position with its latch shoulder 74 almost released from primary latch notch 68 on ratchet, similar to the position shown in FIG. 7. Subsequent movement of pawl 58 in the releasing direction due to continued movement of manual release cam 206 from its pawl engaging position to its full travel position with result in pawl 58 being located in its ratchet releasing position.

FIG. 14 illustrates completion of the manual latch release operation upon movement of door handle 24 to its pulled position. As such, backup release lever 202 is shown now located in its end of travel position. With manual release cam 206 located in its full travel position, a stop surface 206B formed thereon engages pawl cam surface 208A on pawl release boss 208 and functions to locate pawl 587 in its ratchet disengaging position so as to permit ratchet 52 to move to its striker release position shown. A reaction force, as indicated by force line 230, is shown to be offset relative to pivot post 106. Accordingly, upon door handle 24 returning to its released position, backup release lever spring 204 is permitted to drive backup release lever 202 back to its home position and allow pawl spring 62 to forcibly pivot pawl 58 back toward its ratchet holding position with its latch shoulder 74 engaging ratchet guide surface 71. The force vector 230 in this instance is different than force vector 120 described above. Force vector 230, being offset from the axis of rotation of lever 202, thereby creates a rotational return force, unlike vector 120, which extends generally through the axis of rotation of the gear 104, and thereby does not generate a rotational return force on gear 104.

Referring now to FIGS. 15A through 15E, a mechanical backup reset mechanism 300 is shown provided in association with power release actuator 48 of closure latch assembly 18. Pivot post 106 is disclosed to be fixed to power release gear 104 and is shown to include an end portion 106A having a tool receiving notch 106B formed therein. Notch 106B is adapted to accept a tool 106C (i.e. a screw driver or key) to facilitate manual rotation of power release gear in the resetting direction, as indicated by arrow 306. Thus, dual-stage geartrain 88 and electric motor 86 can be back-driven to permit manual reset of power release actuator 48 back into its non-actuated state in the event a situation (i.e. a loss of power) prevents powered resetting of power release actuator 48. As described previously, in the event of a loss of power, the force vector 120 exerted on gear 104 extends through its axis of rotation, thereby not causing a rotational backdriving force. Upon manual rotation out of this position, the force vector 120 will become offset from the axis of rotation, such that the resetting force of the pawl 58 will assist in resetting and backdriving the power release actuation 48.

Figure 15B:
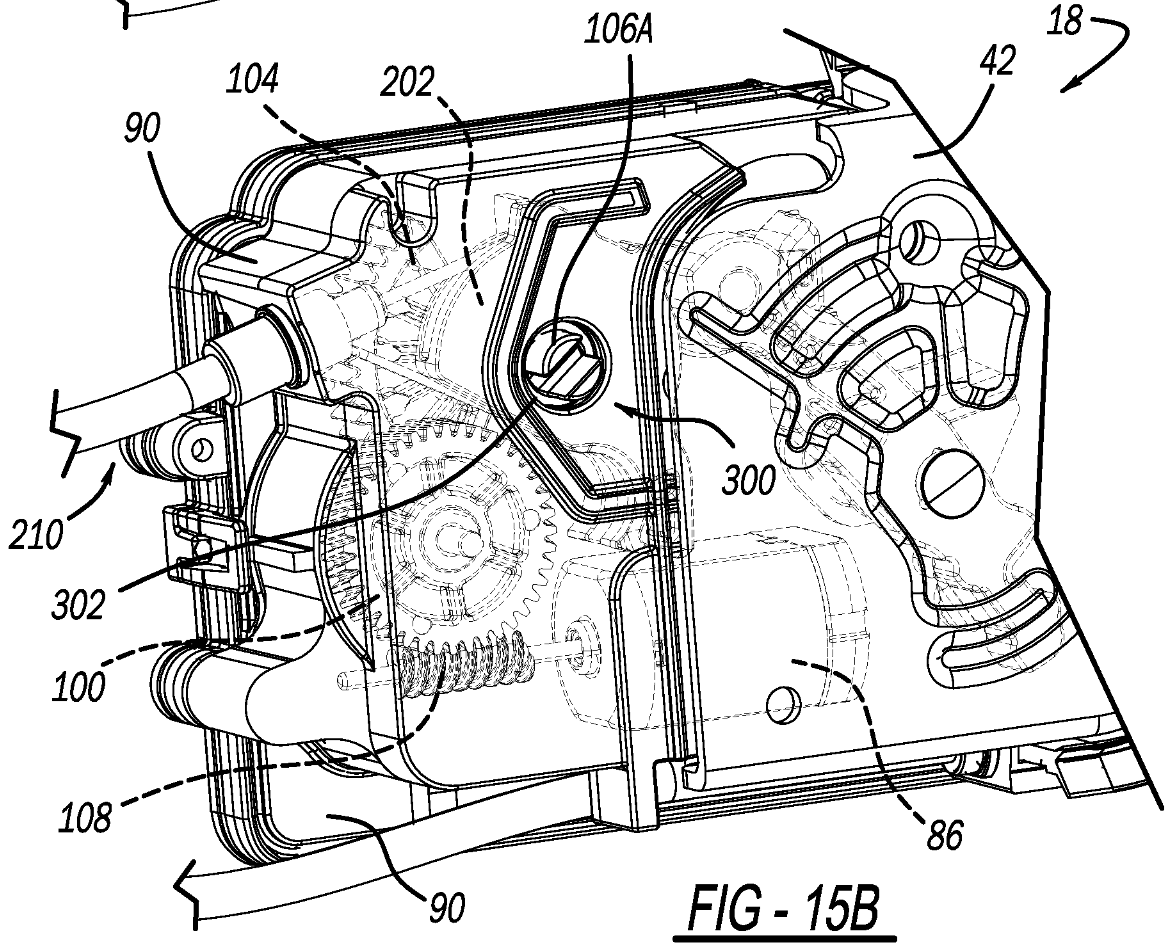
Figure 15C:
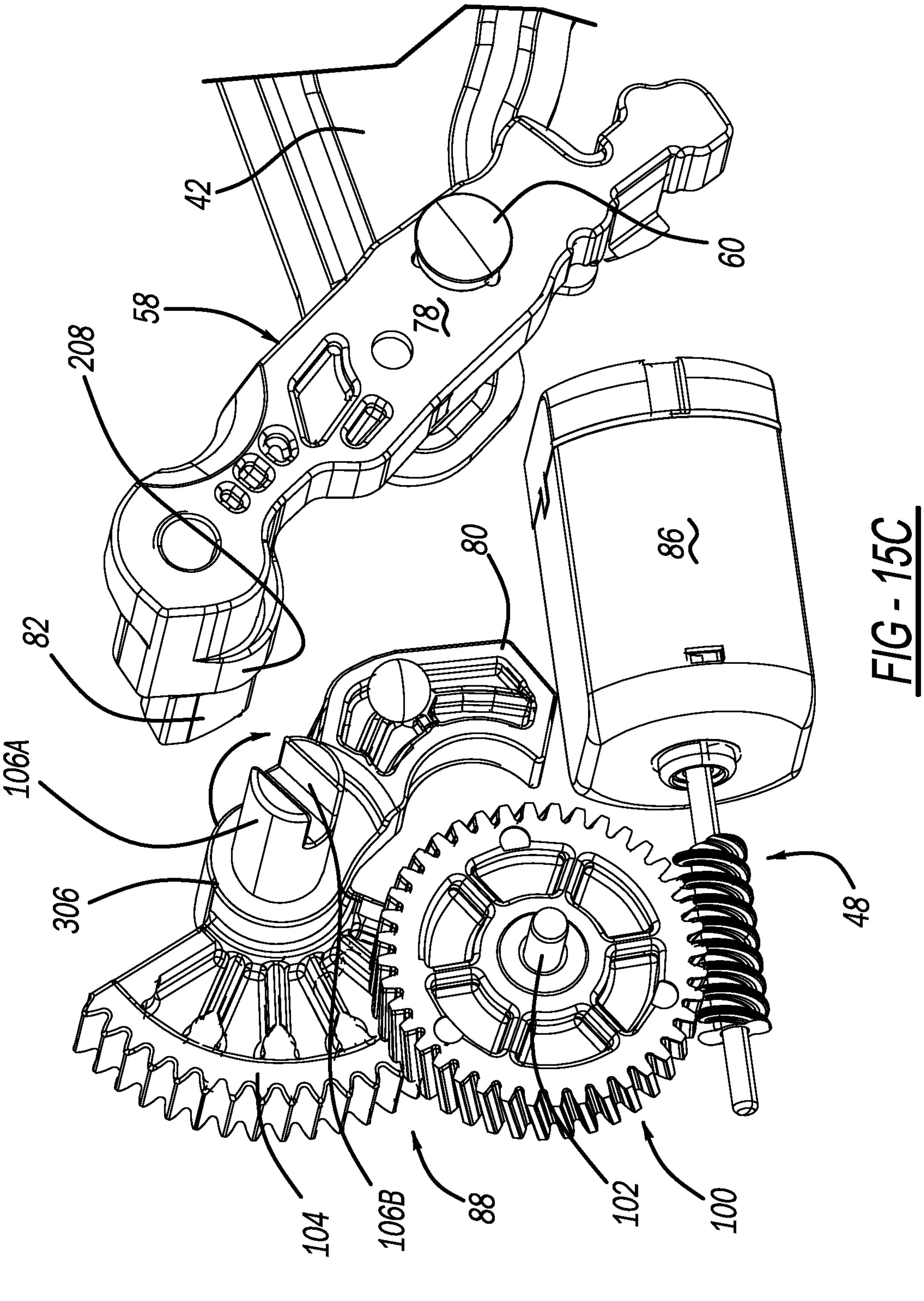
Figure 15D:
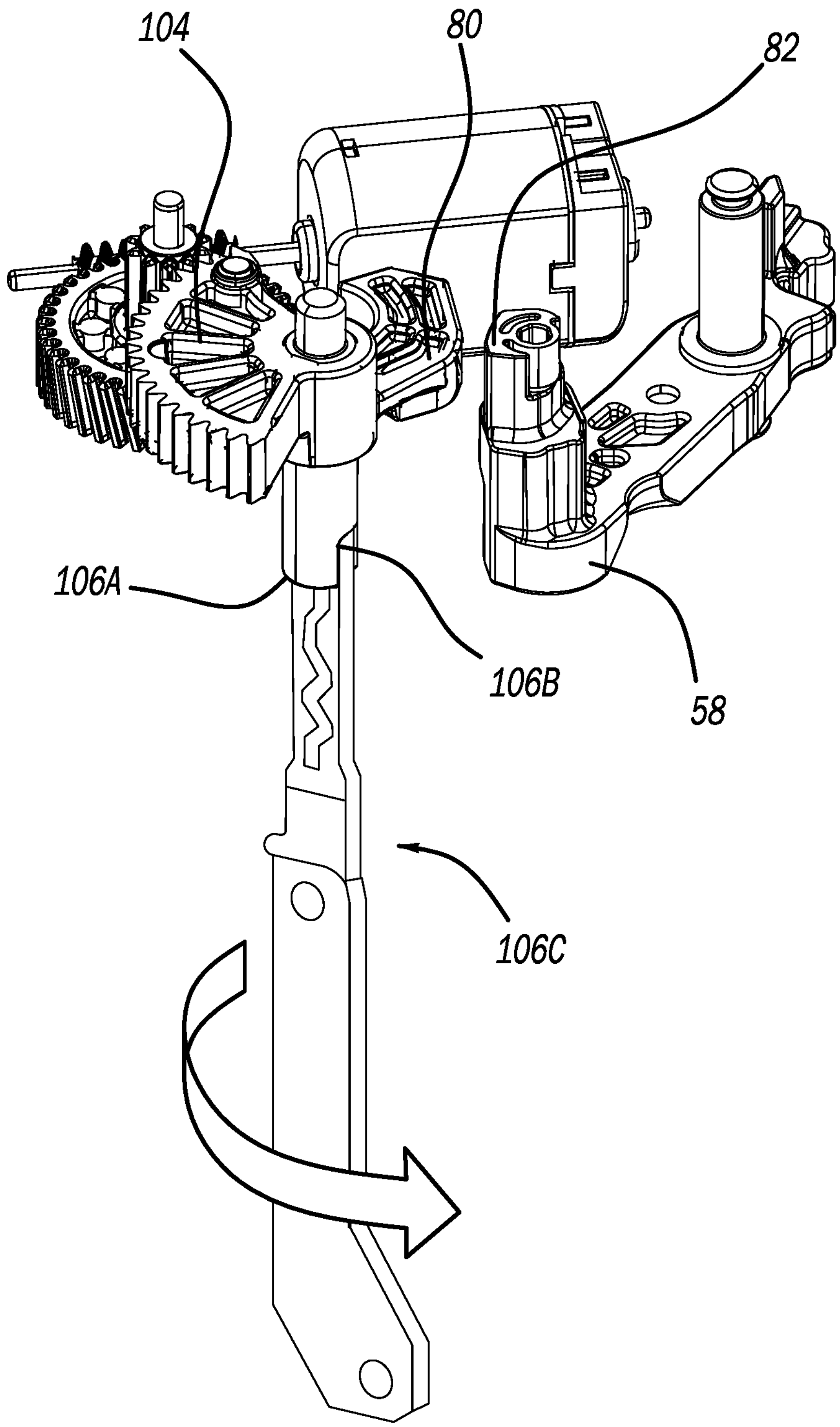
FIG. 15D illustrates a tool for actuating the mechanical backup reset.
Figure 15E:
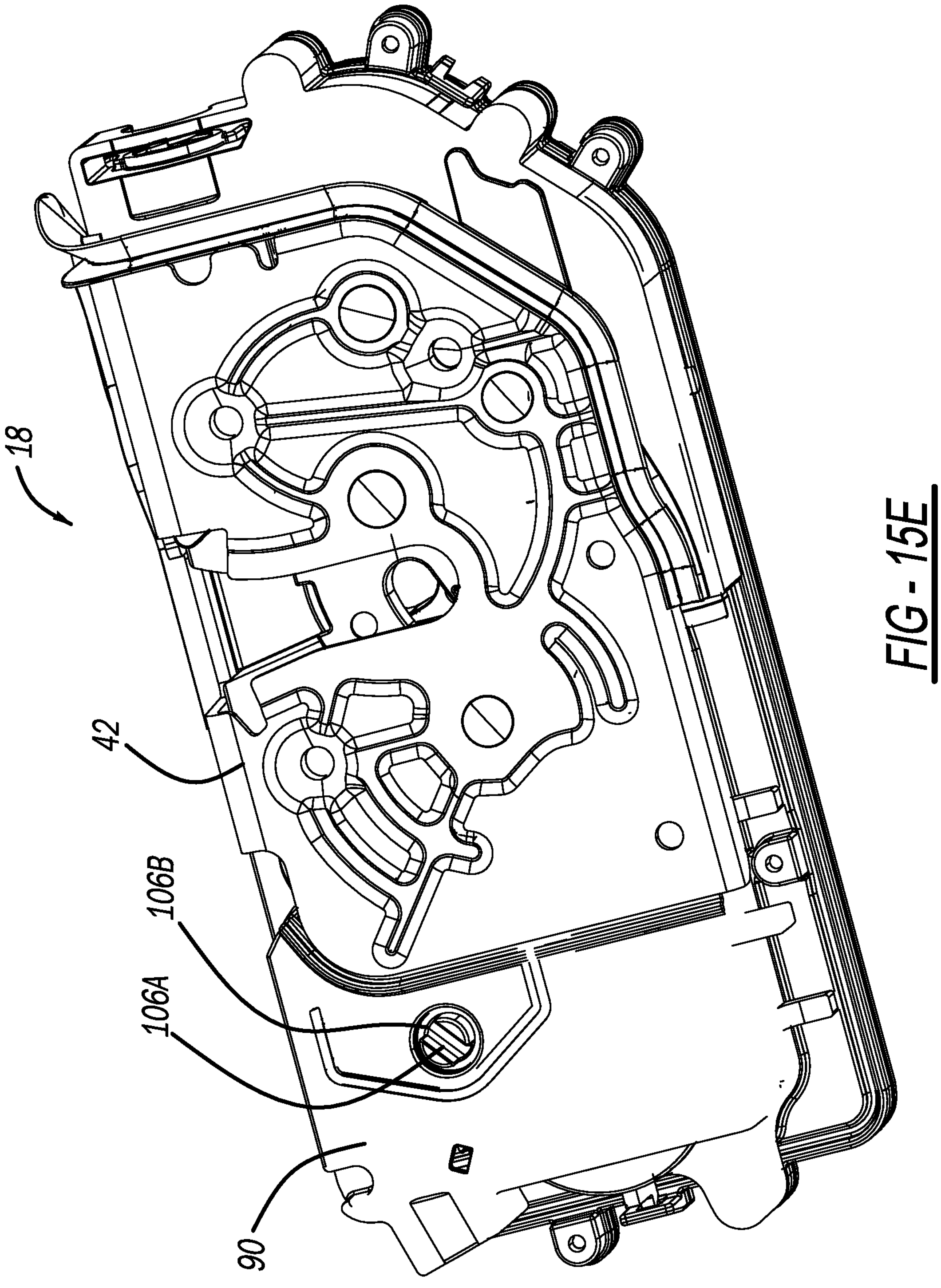
FIG. 15E illustrates access to the mechanical backup reset.
Figure 15F:
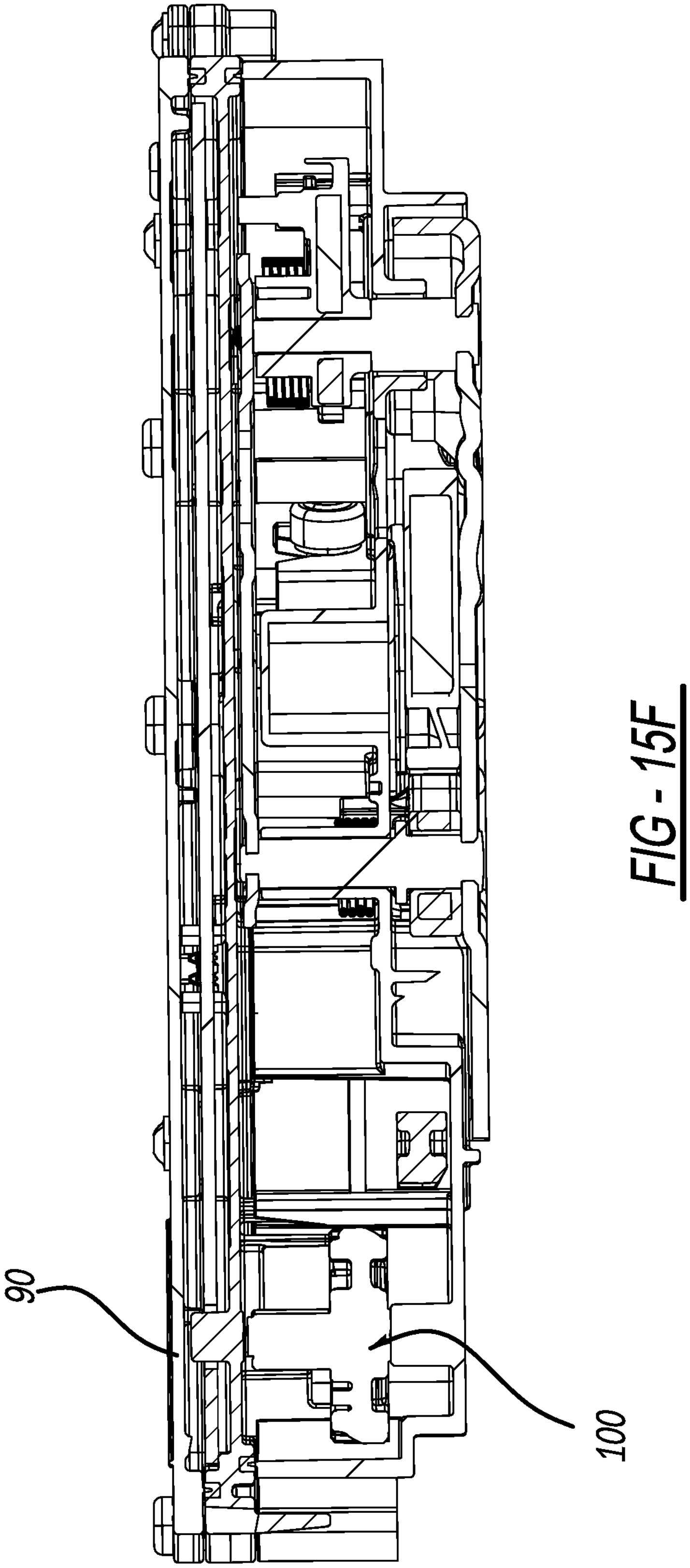
FIG. 15F is a cross-sectional front view illustrating the compound gear mounted to the actuator housing and not the latch plate.
Figure 15G:
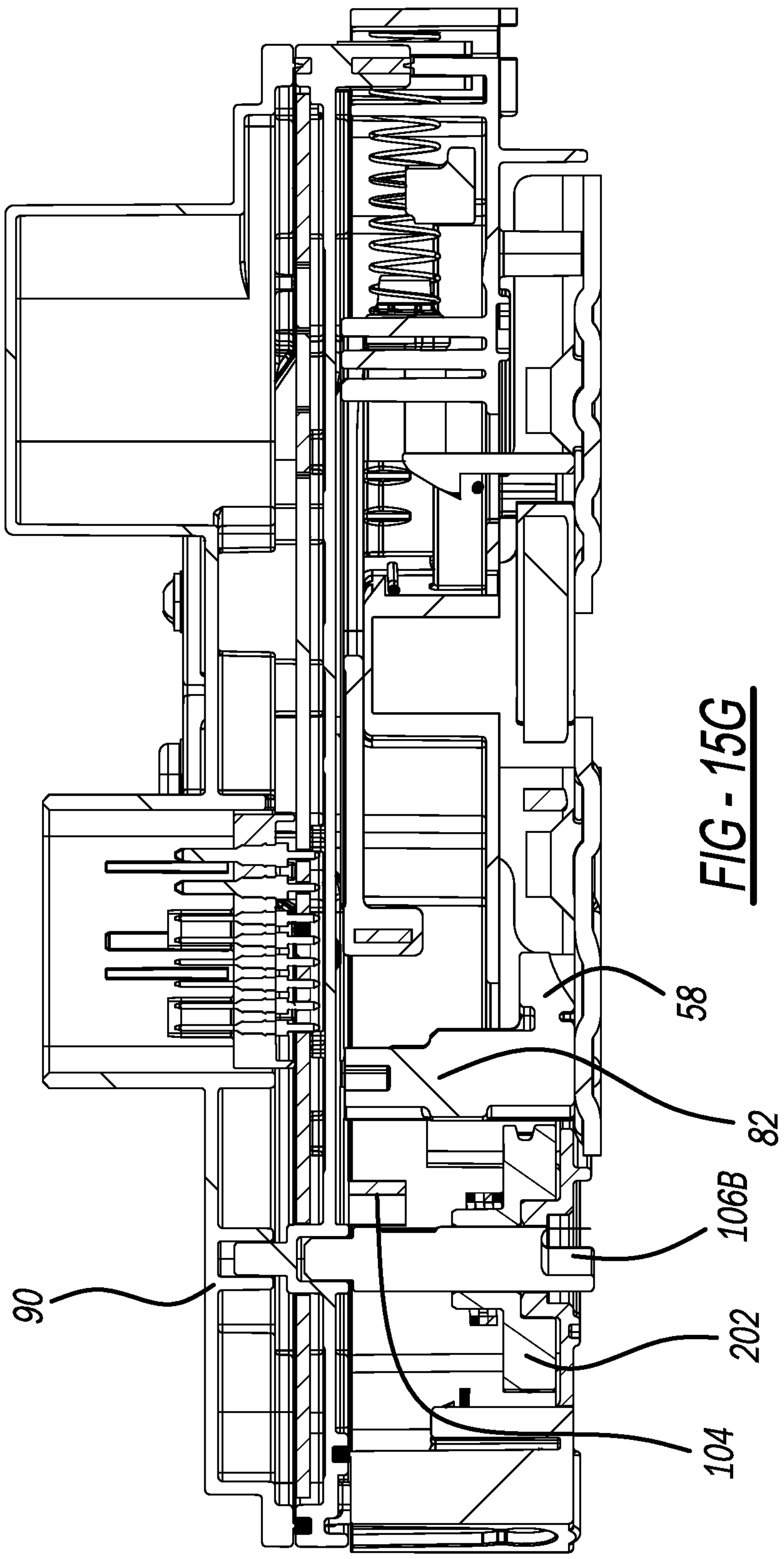
FIG. 15G is a cross-sectional front view illustrating the sector gear mounted to the actuator housing and not the latch plate.

FIG. 15B illustrates the housing 90 that is configured for attachment to the latch plate 42. As shown in FIG. 15B, as discussed above, gears 100 and 104 are attached to the housing 90 rather than the latch plate 42. FIG. 15A illustrates post 106 extending out through an opening 302 of housing 90.

Figure 16:
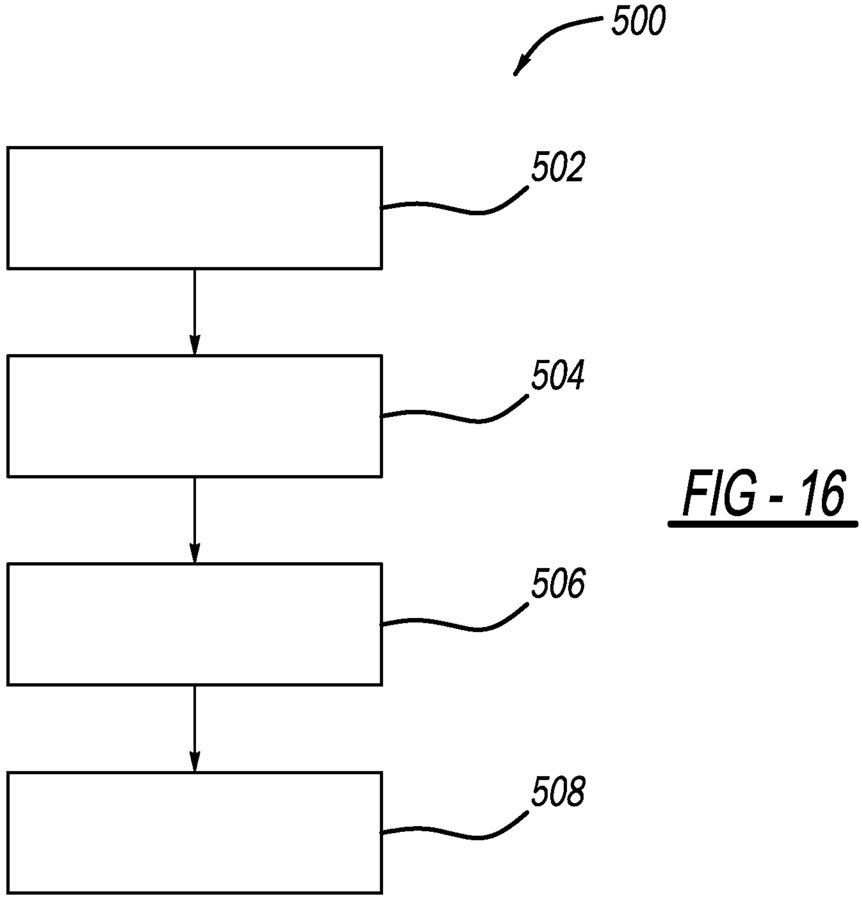
FIG. 16 illustrates a method for providing the power release operation of the closure latch assembly of the present disclosure via actuation of the power release actuator.

Referring now to FIG. 16. a block diagram illustrates a non-limiting method 500 of controlling operation of closure latch assembly 18 for actuating power release actuator 48 for providing the power release feature. Method 500 includes the step (block 502) of providing closure latch assembly 18 with single pawl/ratchet latch mechanism 44, latch release mechanism 46, and power release actuator 48 having an electric motor 86 and dual-stage geartrain 88 disposed between motor gear 108 and power release gear 104. In the next step (block 504) of method 500, a power release request initiated via fob 30 and sensors 36 is authenticated by latch ECU 34 which functions to energize motor 86 and drive power release gear 104, via dual-stage geartrain 88, in the releasing direction from its home position to its end of travel position for shifting power release actuator from its non-actuated state to its actuated state. Subsequently, method 500 includes the step (block 506) of shifting latch release mechanism 46 from its non-actuated state into its actuated state in response to such movement of power release gear 104 which causes pawl 58 of latch mechanism 44 to move from its ratchet holding position into its ratchet releasing position. In response, as indicated at block 508, ratchet 52 moves from its striker capture position to its striker release position and completes the latch releasing portion of the power release operation. A power-operated latch resetting portion of the power release operation follows the latch releasing portion and functions to shift power release actuator 48 back to its non-actuated state and locate power release gear 104 in its home position. This power resetting function is provide by motor 86 driving power release gear 104, via dual-stage geartrain 88, in the resetting direction until it is located in its home position while latch mechanism 44 remains in its unlatched state.

Referring to FIG. 17, a method 600 for resetting power release actuator 48 from its actuated state back to its non-actuated state during a no-power situation is disclosed. In particular, a first step (block 602) of method 600 includes providing closure latch assembly 18 with backup reset mechanism 300 in association with power release actuator 48. Block 604 discloses the step of manually rotating power release gear 104 from its end of travel position back to its home position by back-driving dual-stage geartrain 88 and electric motor 86.

Now referring to FIGS. 18A to 18D corresponding to enlarged areas of FIGS. 5, 6, 8 and 10 respectively, there is illustrated a sequence of operation of the power release cam 80 engaging with pawl release lug 82. Power release cam 80 is shown to have a convexed or spiraled extending arm having a first cam region 77 extending within a first radius r1 of power release gear 104 and having a second cam region 79 extending between the first radius r1 of power release gear 104 and a second radius r2 beyond the first radius r1 of power release gear 104. Outer edge of cam 80 is shown to correspond to the radius r2, and outer edge of gear 104 generally corresponds to the radius r1. Accordingly, second cam region 79 is disposed generally radially outside of gear 104, and first cam region 77 is disposed generally radially inside of gear 104.

Figure 18A:
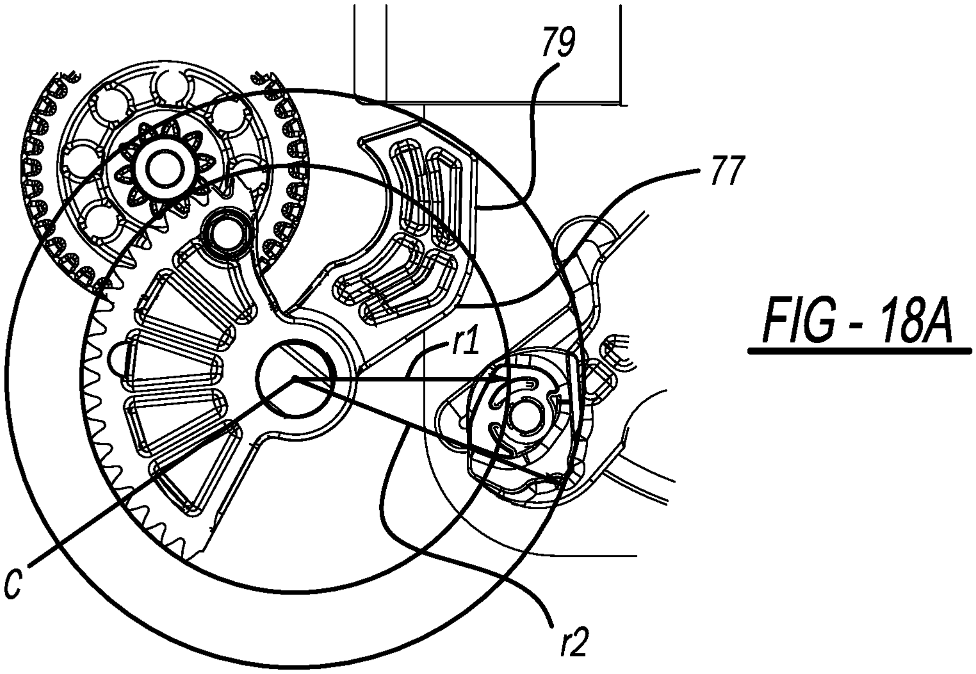
Figure 18B:
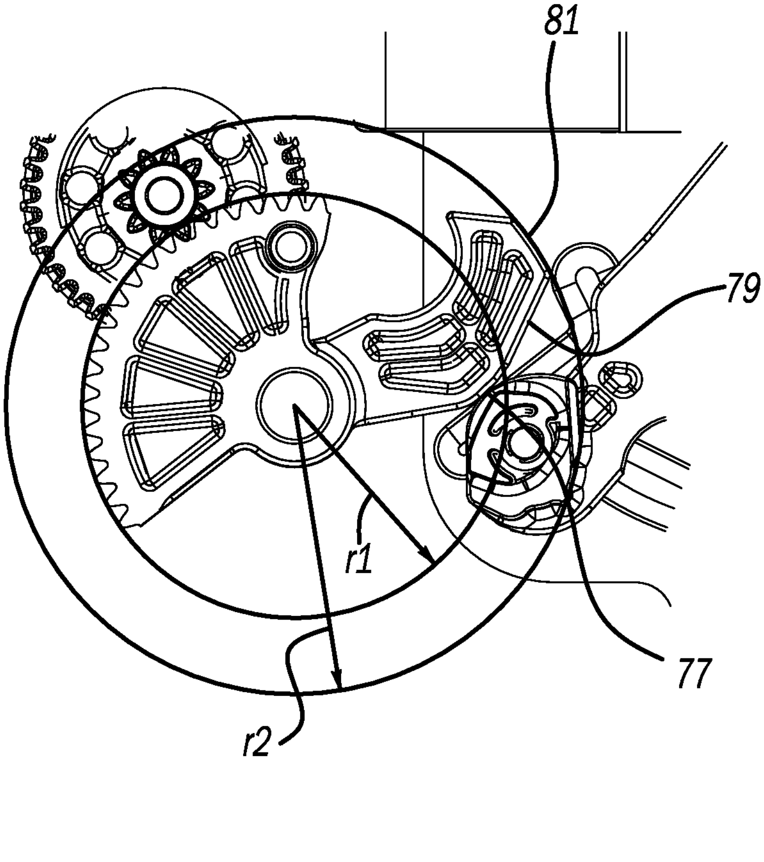

With reference to FIG. 18B, power release cam 80 initially engages with pawl release lug 82 within first radius r1 over a certain rotation of power release gear 104 acting on the pawl release lug 82 with a torque that will increase as the contact point between the power release cam 80 and the pawl release lug 82 shifts outwardly with rotation of power release gear 104.

Figure 18C:
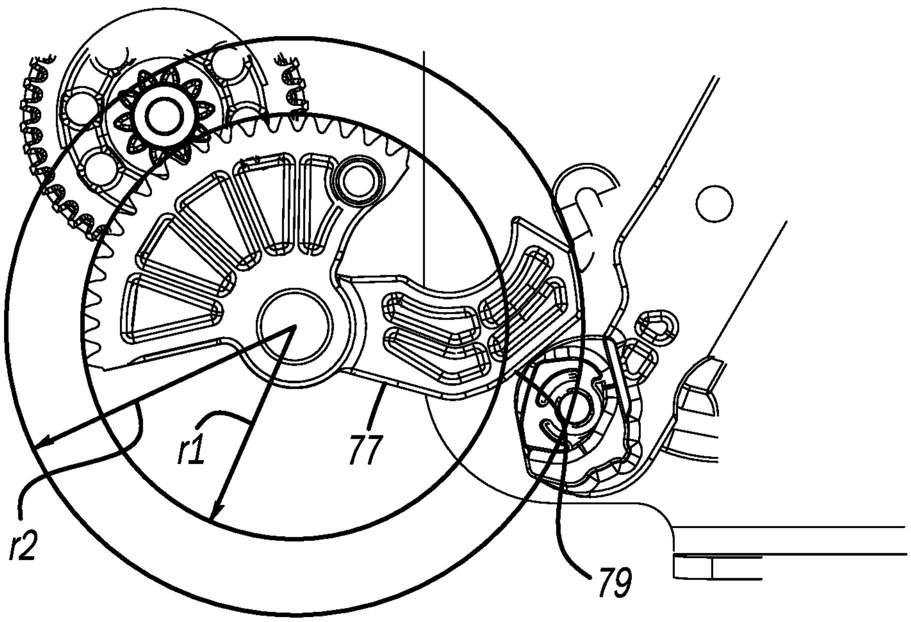
Figure 18D:
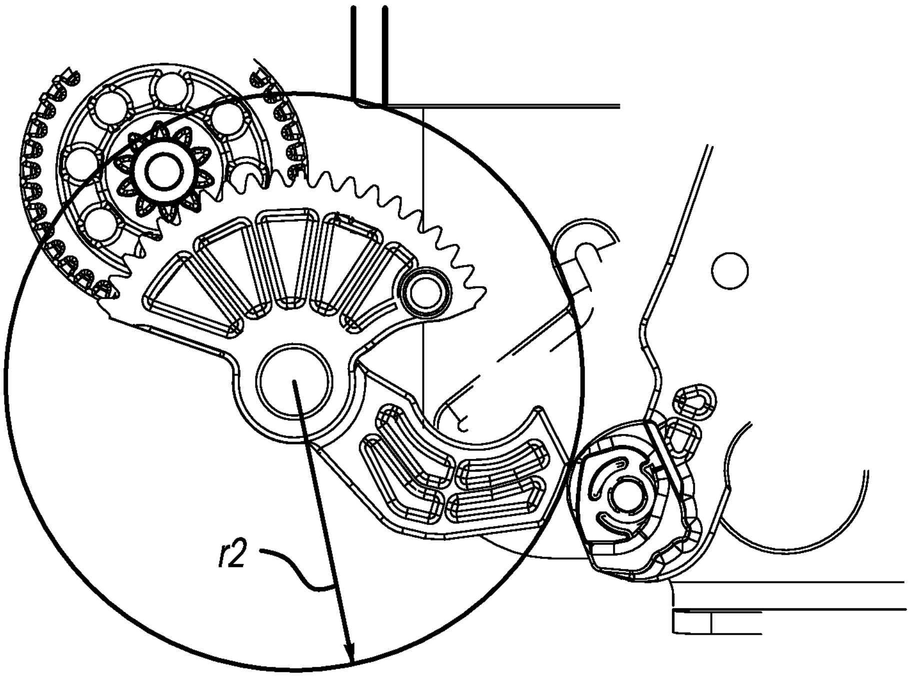

With reference to FIG. 18C, power release cam 80 continues to engage with pawl release lug 82 now within second radius r2 over a further certain rotation of power release gear 104 for acting on the pawl release lug 82 with an increasing torque as the contact point between the power release cam 80 and the pawl release lug 82 continues to shift outwardly with rotation of power release gear 104. The power release cam 80 provides a lever arm acting on the pawl release lug 82 now outside the perimeter of the power release gear 104 for increasing torque acting on the pawl release lug 82 which may assist in overcoming high frictional loads acting between the ratchet shoulder 74 in engagement with one of secondary latch notch 70 and primary latch notch 68 on ratchet 52. The power release cam 80 shown having spiraled extending lever arm reduces the rotational speed of the contact point between the power release cam 80 and the pawl release lug 82 as the contact point moves outwardly from the center C. With reference to FIG. 18C, power release cam 80 is shown to have a third cam region 81 (on the outer edge of cam 80) extending now along a circumferential path about the rotational axis of gear 104 providing a lost motion cam surface wherein a still further certain rotation of power release gear 104 will not affect pivoting of pawl 58 (as the radius of cam 80 no longer increases at this point) but will provide a holding surface against which pawl release lug 82 rests. As discussed above, force vector 120 will continue to extend through the center of gear 104.

The inventive concepts associated with the exemplary embodiments of the present disclosure shown in the drawings and disclosed in the above description are generally directed to addressing and overcoming shortcomings of conventional closure latch assemblies equipped with a single pawl/ratchet latch mechanism and a power-operated latch release mechanism which are incapable of generating sufficient mechanical advantage and corresponding latch release forces required to facilitate latch release in post-crash high seal load conditions (i.e. up to about 5 kN) via a backup energy source (i.e. 9V Supercapacitor). However, most single pawl/ratchet latch mechanism configurations are well-suited for facilitating latch release in lower post-crash seal load conditions (i.e. up to about 1.5 kN) and have shown, both experimentally and mathematically, to generate actual latch release times (i.e. in the range of about 50 ms) that are significantly better than typical customer/regulatory requirements (i.e. in the range of about 150 ms). The solution presented by the present disclosure is to compromise between slightly increased latch release times (still well within the acceptable range) and significantly increased mechanical advantage providing correspondingly increased latch release forces. This solution is provided by integrating a dual-stage geartrain into the power release actuator that is operably disposed between the electric motor and the latch release mechanism in a compact arrangement. In particular, the dual-stage geartrain is designed to increase the overall system mechanical transmission ratio while staying well within the acceptable latch release time requirement. Moreover, this solution is scalable and the transmission ratio generated by the dual-stage geartrain and the power output of the electric motor can be adjusted according to specific post-crash seal load requirements. For solutions up to about 2-3 kN post-crash seal load requirements, the two-start motor worm 108 embodiment shown in association with FIG. 4B is applicable. For solutions up to about 5 kN post-crash seal load, the one-start motor worm 108 embodiment shown in association with FIG. 4A is applicable.

With reference to FIG. 4B, the this solution provides higher overall system efficiency and facilitates back-driveability for manual reset bac-up. The solution of FIG. 4B furthermore includes a shorter release time relative to the one-start motor worm gear 108 of FIG. 4A. In the embodiment of FIG. 4B, the worm gear 108 includes 2 teeth, the helicoidal gear 112 includes 40 teeth, gear 114 has 12 teeth, and gear 104 has 47 teeth. The embodiment of FIG. 4B is exemplary, and it will be appreciated that other gear ratios and teeth could also be used.

Figure 4A:
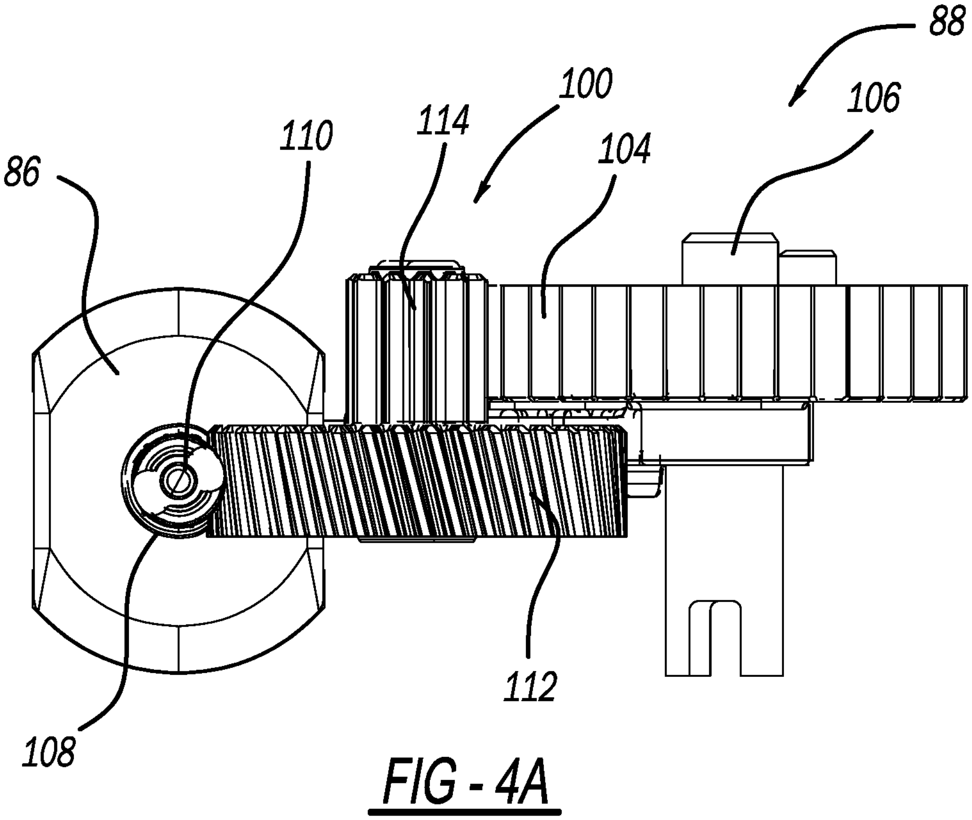
FIG. 4A is an end view of a dual-stage geartrain associated with the power release actuator according to a first embodiment and providing a non-limiting listing of exemplary gear data associate therewith.
Figure 4B:
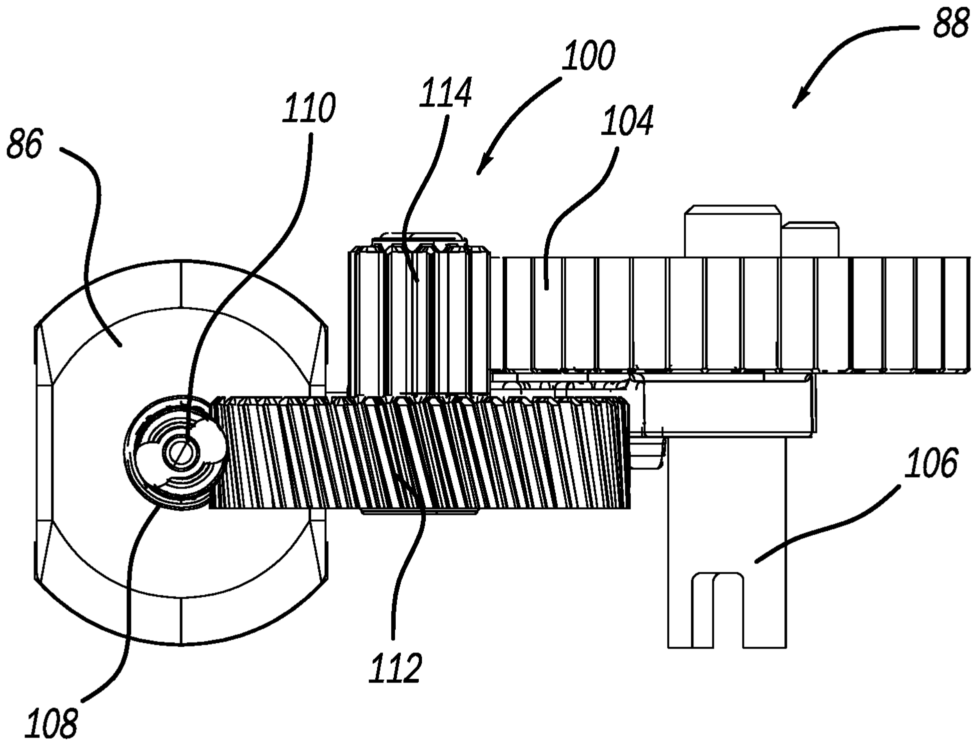
FIG. 4B is an end view of an alternative dual-stage geartrain associated with the power release actuator according to a second embodiment and providing a non-limiting listing of exemplary gear data associated therewith.

In contrast, the one-start motor worm 108 embodiment associated with FIG. 4A is preferred for post-crash seal load requirements exceeding 3 kN, including up to about 5 kN post-crash seal load. The solution of FIG. 4A has a higher transmission ratio than FIG. 4B, thereby increasing capability to release the seal load. This solution has a longer release time than FIG. 4B, and a lower overall gear train efficiency. Accordingly, the back-driveability for manual reset back-up is also reduced relative to FIG. 4A. In the embodiment of FIG. 4A, the worm gear 108 has one tooth, the helicoidal gear has 36 teeth, gear 114 has 12 teeth, and gear 104 has 47 teeth. The embodiment of FIG. 4A is exemplary, and it will be appreciated that other gear ratios and teeth could also be used.

In FIGS. 4A and 4B, the gear-layout is generally the same, and actuation and back-driving also functions the same. Accordingly, depending on the needs of the system, the resulting design may be selected taking into account the pros and cons of the one-start and two-start arrangement described above.

The foregoing description of the embodiments has been provided for purposes of illustration and description. It is not intended to be exhaustive or to limit the scope of protection afforded to the disclosure. Individual elements or features of a particular mechanism or embodiment are not intended to be limited to that particular mechanism or embodiment but, where applicable, are interchangeable and can be used in alternative embodiments, even if not specifically shown or described. The same may be varied in many ways and such variations are not to be regarded as a departure from the disclosure, but rather contemplated to be included with the fair and reasonable scope of the disclosure.

The invention claimed is:

1. A latch comprising:

a multi-stage geartrain including at least two meshed engagements, wherein the multi-stage geartrain operatively couples an output of a motor of a power release actuator to a pawl of a latch release mechanism;

wherein an output of the multi-stage geartrain is decoupled from the pawl until after the multi-stage geartrain has developed inertia in response to actuation of the motor;

wherein the pawl has a ratchet holding position whereat the pawl holds a ratchet in a latched state and a ratchet releasing position whereat the ratchet is an unlatched state;

wherein, after developing inertia in response to actuation of the motor, the output of the multi-stage geartrain contacts the pawl and pivots the pawl from the ratchet holding position to the ratchet releasing position;

wherein the pawl includes a first leg segment extending in a first direction from a pivot axis of the pawl and a second leg segment located on the opposite side of the pivot axis of the pawl and extending in a second direction opposite the first direction from the pivot axis of the pawl, wherein the first leg segment is longer than the second leg segment, wherein the first leg segment is adapted to be contacted by the output of the multi-stage geartrain, and the second leg segment is adapted to hold the ratchet in the latched state.

2. The latch of claim 1, wherein the multi-stage geartrain includes a first gear in meshed engagement with a second gear, wherein the first gear is a compound gear and the second gear is a sector gear.

3. The latch of claim 2, wherein the compound gear includes a worm wheel in meshed engagement with a worm gear, wherein the worm gear is disposed on an output shaft of the motor.

4. The latch of claim 3, wherein the sector gear includes an arm extending radially outward therefrom.

5. The latch of claim 4, wherein the arm is disposed in the same plane as the multi-stage geartrain such that the arm is disposed within an axial height defined by the multi-stage geartrain.

6. The latch of claim 5, wherein the arm has a curvature configured to act as a cam.

7. The latch of claim 6, wherein the arm includes a first curved surface that contacts the pawl and pivots a position of the pawl in response to a first range of rotational movement of the sector gear, and the arm includes a second curved surface that contacts the pawl and maintains the position of the pawl in response to a second range of rotational movement of the sector gear that is beyond the first range.

8. The latch of claim 1, wherein the second leg segment includes a latch shoulder configured to contact the ratchet to hold the ratchet when the pawl is in the ratchet holding position, and the first leg segment includes a cam surface, wherein an arm extending from a sector gear of the multi-stage geartrain contacts the cam surface to pivot the pawl away from the ratchet holding position.

9. The latch of claim 1, wherein an arm extending from the multi-stage geartrain includes a first cam region and a second cam region, wherein the first cam region extends within a first radius of a sector gear of the multi-stage geartrain, wherein the second cam region extends between the first radius and a second radius that is greater than the first radius.

10. The latch of claim 9, wherein the second radius is greater than the maximum radius of the sector gear such that the arm extends beyond the radius of the sector gear.

11. The latch of claim 1, further comprising a printed circuit board ("PCB"), wherein PCB includes a plurality of hall sensors configured to detect the position of at least one of a sector gear, the pawl, or the ratchet.

12. The latch of claim 1, wherein torque of the output of the multi-stage geartrain on the pawl increases following initial contact between an arm extending from the multi-stage geartrain and the pawl at a point of contact between the arm and the pawl and during further rotation of a sector gear of the multi-stage geartrain, wherein the torque increases as a result the point of contact between the arm and the pawl moving radially outward during further rotation of the sector gear.

13. The latch of claim 1 further including a manual release mechanism including a manual release lever having a manual release arm, wherein the pawl includes a boss disposed at an end of the pawl, wherein the manual release arm is spaced away from the boss and defines a gap when in a rest position, and wherein the manual release arm rotates toward the boss in response to manual actuation, wherein the manual release arm contacts the boss to pivot the pawl away from the ratchet holding position after the manual release arm rotates through the gap, wherein the manual release lever is coaxial with a sector gear of the multi-stage geartrain and rotatable independently relative to the sector gear.

14. The latch of claim 1, further comprising a mechanical backup reset mechanism configured to permit manual movement of a sector gear of the multi-stage geartrain from an end of travel position back to its home position for back-driving the multi-stage geartrain and manually resetting the power release actuator into its non-actuated state.

15. The latch of claim 2, wherein the first gear and the second gear are mounted to an actuator housing that is separate from a latch plate, wherein the pawl and ratchet are mounted to the latch plate.

16. A method of controlling operation of a closure latch assembly, the method comprising the steps of:

providing a closure latch assembly having a multi-stage geartrain including at least two meshed engagements, a power release actuator, a pawl, and a ratchet, wherein an output of the multi-stage geartrain is decoupled from the pawl in a rest position prior to actuation of the power release actuator, wherein the pawl has a ratchet holding position wherein the pawl holds the ratchet in a latched state and a ratchet releasing position wherein the pawl allows the ratchet to pivot to an unlatched state;

actuating the power release actuator;

pivoting the output of the multi-stage geartrain through a degree of rotation prior to contacting the pawl and developing inertia;

after developing inertia, contacting the pawl with the output of the multi-stage geartrain;

after contacting the pawl, continuing to pivot the output of the multi-stage geartrain and pivoting the pawl out of the ratchet holding position and into the ratchet releasing position; and pivoting the pawl to a stable position whereat the pawl is prevented from moving toward the ratchet holding position with the power release motor having ceased actuating wherein the pawl includes a first leg segment extending in a first direction from a pivot axis of the pawl and a second leg segment located on the opposite side of the pivot axis of the pawl and extending in a second direction opposite the first direction from the pivot axis of the pawl, wherein the first leg segment is longer than the second leg segment wherein the first leg segment is adapted to be contacted by the output of the multi-stage geartrain, and the second leg segment is adapted to hold the ratchet in the latched state.

17. The method of claim 16, wherein the multi-stage geartrain includes a first gear in the form of a compound gear in meshed engagement with a second gear in the form of a sector gear, wherein the sector gear includes an arm extending radially therefrom, wherein the arm is the output of the multi-stage geartrain and contacts the pawl to pivot the pawl in response to contact therebetween.

18. The method of claim 17, wherein a contact point defined between the arm and the pawl increases in a radially outward direction in response to continued rotation of the arm and pivoting of the pawl, wherein the contact point between the arm and the pawl at an end of travel position of the sector gear has a radius greater than a maximum radius of the sector gear.

19. The method of claim 17, wherein the multi-stage geartrain defines an axial height and the arm is disposed axially within the axial height of the multi-stage geartrain.

20. The latch of claim 1, wherein the output of the multi-stage geartrain is coupled to a manual reset mechanism configured to backdrive the multi-stage geartrain to move the geartrain from an actuated state to a non-actuated state.

21. The latch of claim 1, wherein the motor is configured to receive power from a backup energy source in a post-crash condition to drive the multi-stage geartrain to output a higher release force on the pawl during the post-crash condition.

22. The method of claim 16, wherein, after pivoting the pawl into the ratchet releasing position, continuing to pivot the output of the multi-stage geartrain while maintaining the pawl in a stable position without causing further rotation of the pawl.

23. A latch comprising:

a multi-stage geartrain, wherein the multi-stage geartrain operatively couples an output of a motor of a power release actuator to a pawl of a latch release mechanism;

wherein the pawl has a ratchet holding position whereat the pawl holds a ratchet in a latched state and a ratchet releasing position whereat the ratchet is an unlatched state;

wherein the output of the multi-stage geartrain is configured to rotate during a power release operation to pivot the pawl from the ratchet holding position to the ratchet releasing position and is configured to rotate during a stable condition of the latch without causing any pivoting of the pawl, and to maintain a position of the pawl in the stable condition with the motor having stopped actuating;

wherein the pawl includes a first leg segment extending in a first direction from a pivot axis of the pawl and a second leg segment located on the opposite side of the pivot axis of the pawl and extending in a second direction opposite the first direction from the pivot axis of the pawl, wherein the first leg segment is longer than the second leg segment, wherein the first leg segment is adapted to be contacted by the output of the multi-stage geartrain, and the second leg segment is adapted to hold the ratchet in the latched state.

* * * * *